(12) United States Patent
Peters et al.

(10) Patent No.: US 9,009,277 B2
(45) Date of Patent: *Apr. 14, 2015

(54) CONFIGURATION MANAGEMENT REPOSITORY FOR A DISTRIBUTED PLATFORM

(71) Applicant: Edgecast Networks, Inc., Santa Monica, CA (US)

(72) Inventors: Robert J. Peters, Santa Monica, CA (US); Lior Elazary, Agoura Hills, CA (US); Jayson G. Sakata, Encino, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,586

(22) Filed: Oct. 21, 2013

(65) Prior Publication Data

US 2014/0047085 A1 Feb. 13, 2014

Related U.S. Application Data

(63) Continuation of application No. 13/222,598, filed on Aug. 31, 2011, now Pat. No. 8,583,769.

(60) Provisional application No. 61/524,294, filed on Aug. 16, 2011.

(51) Int. Cl.
| | |
|---|---|
| *G06F 15/177* | (2006.01) |
| *G06F 15/173* | (2006.01) |
| *H04L 12/24* | (2006.01) |
| *G06F 9/54* | (2006.01) |
| *G06F 17/30* | (2006.01) |
| *G06F 21/62* | (2013.01) |
| *H04L 29/06* | (2006.01) |
| *H04L 29/08* | (2006.01) |
| *H04L 12/26* | (2006.01) |

(52) U.S. Cl.
CPC ............ *H04L 41/0816* (2013.01); *G06F 9/541* (2013.01); *G06F 9/542* (2013.01); *G06F 17/30545* (2013.01); *G06F 17/30566* (2013.01); *G06F 21/6218* (2013.01); *H04L 63/104* (2013.01); *H04L 67/10* (2013.01); *H04L 41/0813* (2013.01); *H04L 43/10* (2013.01)

(58) Field of Classification Search
CPC .................................................. H04L 41/0863
See application file for complete search history.

(56) References Cited

U.S. PATENT DOCUMENTS

| | | | |
|---|---|---|---|
| 5,857,102 A | 1/1999 | McChesney et al. | |
| 6,308,205 B1 | 10/2001 | Carcerano et al. | |

(Continued)

*Primary Examiner* — Joshua Joo

(57) ABSTRACT

Some embodiments provide a repository that manages configurations for a distributed platform and that automatedly configures servers of the distributed platform with different hierarchical sets of configurations while ensuring integrity and consistency across the servers and in the repository. In some embodiment, the repository includes a data store that stores configurations for a first set of servers that are operated by a first service provider and a second set of servers that are operated by a second service provider. The data store also identifies different sets of configurations to deploy to different sets of servers from the first and second sets of servers. The repository also includes a function processor to automatedly deploy the different sets of configurations to the different sets of servers and to perform functions for updating the configurations in a manner that ensures integrity and consistency.

16 Claims, 14 Drawing Sheets

(56) References Cited

U.S. PATENT DOCUMENTS

| | | |
|---|---|---|
| 6,374,295 B2 | 4/2002 | Farrow et al. |
| 6,389,464 B1 | 5/2002 | Krishnamurthy et al. |
| 6,434,619 B1 | 8/2002 | Lim et al. |
| 6,496,858 B1 | 12/2002 | Farilong et al. |
| 6,560,639 B1 | 5/2003 | Dan et al. |
| 6,564,216 B2 | 5/2003 | Waters |
| 6,567,849 B2 | 5/2003 | Ludovici et al. |
| 6,654,891 B1 | 11/2003 | Borsato et al. |
| 6,748,429 B1 | 6/2004 | Talluri et al. |
| 6,760,761 B1 * | 7/2004 | Sciacca ............... 709/220 |
| 6,789,103 B1 | 9/2004 | Kim et al. |
| 6,842,769 B1 | 1/2005 | Kim et al. |
| 6,868,444 B1 | 3/2005 | Kim et al. |
| 7,233,975 B1 | 6/2007 | Gerraty et al. |
| 7,249,174 B2 * | 7/2007 | Srinivasa et al. ...... 709/223 |
| 7,558,835 B1 * | 7/2009 | Shafer ................... 709/213 |
| 8,112,728 B1 | 2/2012 | Hutton et al. |
| 8,509,762 B2 * | 8/2013 | Li et al. ................. 455/423 |
| 2002/0112095 A1 * | 8/2002 | Ford et al. .............. 709/330 |
| 2004/0024853 A1 * | 2/2004 | Cates et al. ............. 709/223 |
| 2006/0041658 A1 | 2/2006 | Nelson et al. |
| 2006/0047798 A1 | 3/2006 | Feinleib et al. |
| 2007/0156392 A1 | 7/2007 | Balchandran et al. |
| 2007/0156845 A1 | 7/2007 | Devanneaux et al. |
| 2007/0266128 A1 | 11/2007 | Bhogal et al. |
| 2008/0065650 A1 * | 3/2008 | Kim et al. ................. 707/10 |
| 2008/0196107 A1 | 8/2008 | Yip et al. |
| 2008/0275970 A1 * | 11/2008 | Barsness et al. ........ 709/221 |
| 2009/0019139 A1 * | 1/2009 | Strassner ................ 709/220 |
| 2011/0153675 A1 | 6/2011 | Dunnell et al. |
| 2012/0102166 A1 * | 4/2012 | Wackerly ................ 709/222 |
| 2012/0198050 A1 * | 8/2012 | Maki et al. ............. 709/224 |
| 2012/0198515 A1 | 8/2012 | Bennett et al. |
| 2013/0007441 A1 * | 1/2013 | Stern et al. .............. 713/100 |
| 2013/0144997 A1 | 6/2013 | Kim et al. |

* cited by examiner

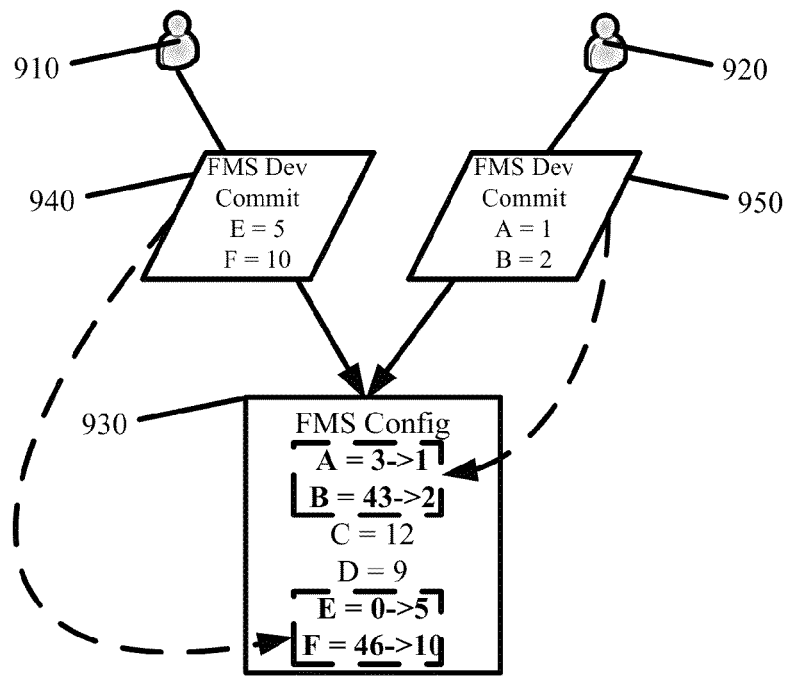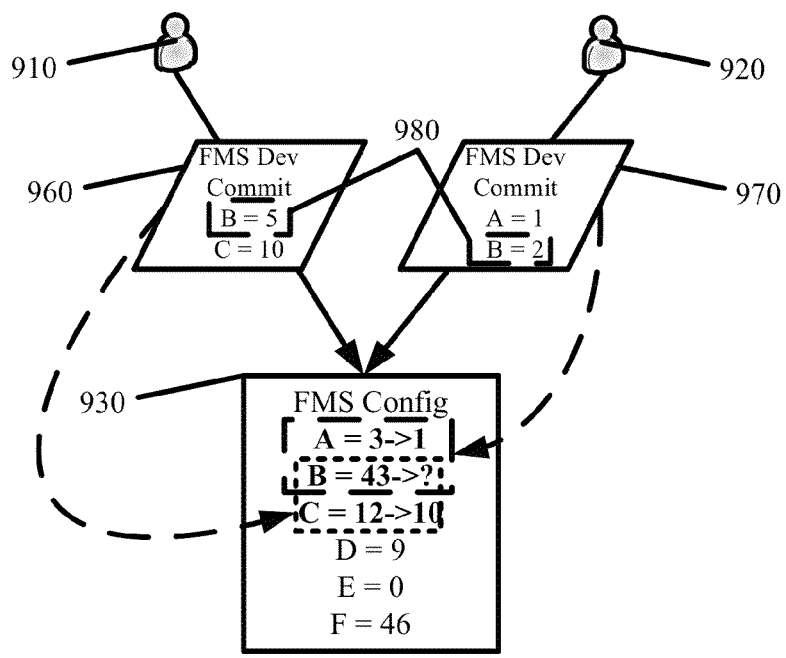
Figure 9

CONFIGURATION MANAGEMENT REPOSITORY FOR A DISTRIBUTED PLATFORM

CLAIM OF BENEFIT TO RELATED APPLICATIONS

This application is a continuation of U.S. non-provisional application Ser. No. 13/222,598, entitled "Configuration Management Repository for a Distributed Platform", filed Aug. 31, 2011 which claims the benefit of U.S. provisional application 61/524,294, entitled "Open Content Delivery Network Platform with Capacity Exchange", filed Aug. 16, 2011. The contents of application Ser. Nos. 13/222,598 and 61/524,294 are hereby incorporated by reference.

TECHNICAL FIELD

The present invention relates to distributed platforms and, more specifically, to a repository for managing configurations for servers of a distributed platform including a content delivery network.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs that are responsible for the delivery of terabytes worth of content. FIG. 1 illustrates a representative infrastructure for some such CDNs. As shown in FIG. 1, the infrastructure includes a distributed set of edge servers 110, traffic management servers 120, and an administrative server 130. The figure also illustrates the interactions that CDN customers including content publishers have with the CDN and interactions that content consumers or end users have with the CDN.

Each edge server of the set of edge servers 110 may represent a single physical machine or a cluster of machines. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. The edge servers run various processes that (1) manage what content is cached, (2) how content is cached, (3) how content is retrieved from the origin server when the content is not present in cache, (4) monitor server capacity (e.g., available processor cycles, available memory, available storage, etc.), (5) monitor network performance (e.g., latency, downed links, etc.), and (6) report statistical data on the delivered content. The set of edge servers 110 may provide the monitoring information to the traffic management servers 120 to facilitate the routing of content consumers to the optimal edge servers. The set of edge servers 110 may provide the statistical data to the administrative server 130 where the data is aggregated and processed to produce performance reports for the delivery of the customers' content.

The traffic management servers 120 route content consumers, and more specifically, content consumer issued requests for content to the one or more edge servers. Different CDN implementations utilize different traffic management schemes to achieve such routing to the optimal edge servers. Consequently, the traffic management servers 120 can include different combinations of Doman Name System (DNS) servers, load balancers, and routers performing Anycast or Border Gateway Protocol (BGP) routing. For example, some CDNs utilize the traffic management servers 120 to provide a two-tiered DNS routing scheme, wherein the first DNS tier resolves a DNS request to the CDN region (or POP) that is closest to the requesting content consumer and the second DNS tier resolves the DNS request to the optimal edge server in the closest CDN region. As another example, some CDNs use Anycast routing to identify the optimal edge server.

The administrative server 130 may include a central server of the CDN or a distributed set of interoperating servers that perform the configuration control and reporting functionality of the CDN. Content publishers register with the administrative server 130 in order to access services and functionality of the CDN. Accordingly, content publishers are also referred to as customers of the CDN. Once registered, customers can interface with the administrative server 130 to specify a configuration and view performance reports.

Generally, a customer configuration identifies the content that is to be delivered by the CDN, the amount of CDN resources to provision, and the caching policies for the provisioned resources as some examples. However, the customer configuration cannot be deployed to one or more of the edge servers unless the edge servers are configured to support the customer configuration. To support the customer configuration, the edge servers are first configured with a base configuration that includes an operating system (OS), communication parameters (e.g., Internet Protocol (IP) address), and security parameters as some examples. Next, the edge servers are configured with a set of applications that execute or otherwise implement the customer configuration. Next, the set of applications are themselves configured for storage, logging, service attributes, and the like.

The problem for any CDN and any distributed platform is how to effectively deploy and manage the various configurations for hundreds or thousands of customers across hundreds or thousands of edge servers and how to ensure synchronicity across the edge servers. Maintaining synchronicity is complicated because a single customer configuration can be deployed to different edge servers, different edge servers can support different underlying applications and application configurations, and different edge servers can execute on different hardware. When a particular customer's configuration is updated, the update needs to be propagated to each of the edge servers that have been deployed with that customer configuration without breaking existing configurations on the edge servers and without extensive downtime to the servers. Similarly, when an application is updated, the update needs to be propagated to each of the edge servers that are installed with that application without breaking the customer configurations that execute using that application and without extensive downtime to the servers.

Prior art techniques for deploying configurations and maintaining synchronicity across edge servers of a CDN have included manually configuring the edge servers, using portals to remotely configure the edge servers, and using a central database to push configurations to the edge servers. Some such techniques are identified in U.S. Pat. No. 6,868,444 entitled "Server configuration management and tracking", U.S. Pat. No. 6,842,769 entitled "Automatically configured network server", and U.S. Pat. No. 6,789,103 entitled "Synchronized server parameter database". Each of these techniques has various shortcomings that render the techniques less than ideal for configuring edge servers of a large scale CDN or other distributed platform. Some of the shortcomings include (1) extensive downtime while reconfiguring a server, (2) multiple users modifying the same configuration at the same time without proper integrity controls, (3) scalability, (4) overwriting isolated customizations when propagating an update, (5) overwriting a prior configuration when propagating an update without the ability to revert to that prior configuration, and (6) inability to perform incremental updates to a configuration as a result of having to overwrite entire configurations when propagating an update.

Accordingly, there is a need for improved systems and methods to automatedly update and manage the configurations that are deployed to the edge servers of a CDN or other distributed platform. There is a need to rapidly perform such updating while being able to scale to support large numbers of edge servers and large numbers of configurations. There is a need to maintain configuration integrity and consistency across the edge servers while being able to retain customizations that have been applied to already deployed configurations. There is also a need to retain previous configurations to be able to revert to any such previous configurations when needed.

SUMMARY OF THE INVENTION

It is an object of the embodiments described herein to provide a repository that is adapted for configuration management of a distributed platform such as (1) a single content delivery network (CDN) or (2) an Open CDN platform involving a federation of multiple CDNs. It is an object to utilize the repository for rapid and automated configuration of servers of the distributed platform with different hierarchical sets of configurations and for updating the configurations on the appropriate servers while ensuring integrity and consistency across the servers. It is also an object to concurrently provide the ability for one or more users to modify a deployed configuration while (1) retaining integrity and consistency of the configuration across the servers, (2) retaining customizations applied to one or more servers that are to be updated, and (3) retaining the ability to revert to a previous configuration when performance monitoring or troubleshooting reveals that an updated configuration performs worse than a previous configuration.

To achieve these and other objects, some embodiments provide a configuration management repository for distributed platforms. In some embodiments, the repository manages the storing and updating of hierarchical sets of configurations and the repository automatedly deploys the hierarchical sets of configurations to the applicable sets of servers of a distributed platform. Deployment of the hierarchical sets of configurations includes having the configuration management repository push the configurations to the appropriate sets of servers or having the servers pull the appropriate set of configurations from the configuration management repository.

The repository ensures configuration integrity and consistency when committing changes to the configurations and when deploying the configurations across the sets of servers of the distributed platform. In some embodiments, the repository identifies and performs a reconciliation procedure for conflicting modifications submitted by different users modifying the same configuration at some overlapping period of time. To do so, the repository stores a revision history that records previous instances of a configuration. As part of the revision history, the repository also stores performance parameters that are indicative of the performance by that configuration instance when it was deployed. In some embodiments, the repository uses the performance parameters and the previous instances of the configuration to identify and swap out a broken or poor performing newly deployed configuration with an older configuration that is known to achieve a particular level of performance.

In some embodiments, each configuration of the repository and each server of the distributed platform are associated with at least one group. When a configuration is updated, the repository identifies the group that is associated with the configuration. Next, the repository identifies the servers that are associated with the identified group and the repository deploys the update to the identified servers in an automated modular manner. Specifically, the deployment ensures that all servers configured with a particular configuration are updated. In some embodiments, the deployment occurs modularly such that entire configurations are not overwritten but are instead incrementally updated based on portions of the configuration that have been updated. In this manner, customizations applied to one or more specific servers can be retained even when updating the configurations on the servers in an automated manner.

In some embodiments, the repository provides checkout, update, commit, merge, revert, diff, branch, and version tag functions. In some embodiments, the checkout function creates a working copy of a master instance of a configuration that is stored to the repository. The working copy may be hosted on the repository and modified by a user that checked out the configuration, though the modifications are kept separate from the stored master instance of the configuration. Alternatively, the working copy may be placed on the machine of the user that checked out the configuration. In either case, the user can modify the configuration before using the commit function to enter the modifications to the repository's master instance for that configuration. In some embodiments, the repository executes one or more integrity checks for each committed configuration. The integrity checks ensure that modifications committed by two separate users that checked out the same configuration at some overlapping time are "non-conflicting". Non-conflicting modifications are merged into the repository's master version of the configuration. In this manner, two users are allowed to simultaneously modify a configuration without having to "lock" that configuration so long as the modifications do not affect the same portion of the configuration. In some embodiments, "conflicting" changes or changes that do affect the same portion of the configuration are flagged and presented to the user for reconciliation. The integrity checks can also be used to ensure that the copy of the configuration instance being modified by the user is the latest version of the master instance stored to the repository. When the user is modifying a copy of the latest version of the master instance, the user can commit the modifications to the master instance without additional changes needed. Otherwise, changes from the master instance are applied to the copy of the configuration used by the user and any conflicting changes are reconciled to the copy of the configuration used by the user. The commit function can then be invoked to incorporate the modifications from the copy of the checked out configuration to the master instance for that configuration in the repository.

In some embodiments, invoking the merge function automatically updates the copy of a configuration that is checked out by a user with the latest modifications committed to the master instance. In this manner, the user need not commit or otherwise check back in an already checked out configuration in order to receive the latest version of that configuration.

With each committed modification to a configuration, the repository updates an internally stored revision history for that configuration. The revision history includes previous recorded instances for the configuration prior to each committed modification. In some embodiments, the revision history also includes monitored performance parameters for each previous deployed instance of the configuration. This allows for a broken deployed configuration or a poorly performing deployed configuration to be identified and reverted to a previous unbroken or better performing configuration. This is accomplished by using the revert function.

The diff function may be used to identify the modifications that have been made to a particular configuration over time. The diff function may be used for checked out configuration where changes have been made, but the changes have yet to be committed.

The update function deploys the modifications to the applicable set of servers. In some embodiments, the repository deploys committed modifications as soon as the update function is invoked. In some embodiments, the repository automatically invokes the update function immediately after the commit function is invoked. In some embodiments, the repository deploys committed modifications at periodic intervals. This may include a push or pull process, wherein the pull process involves the servers of the distributed platform issuing the update function to the repository in order to obtain the latest instance for configuration.

The branch function creates a fork in the repository for a configuration or set of configurations, wherein one branch of the fork retains the master instance of the configuration and another branch of the fork is a copy that can be modified separately from the master instance. Customers and developers can then make and test modifications separate from the master instance and when the testing is complete, the branch can be merged with the master instance or maintained as a master instance for a new configuration.

The version tag function enables users the ability to specify custom versioning information to include with each version of a configuration. For instance, rather than have the repository automatically increment a version number, the user can specify a version that is more descriptive such as "public release 2.0" or "beta release 2.1".

In some embodiments, the servers that receive configurations from the configuration management repository facilitate an end-to-end monitoring function to compliment the configuration management functions of the repository. The end-to-end monitoring involves independent versioning of the configurations that are deployed to the servers. More specifically, each server issues a timestamp or other versioning to indicate when a configuration has been successfully deployed to the server or when other states or conditions occur as part of configuration deployment. In some embodiments, the servers issue timestamps with more granularity. Such granularity can be used to indicate a line-by-line, service-by-service, daemon-by-daemon, or incremental successful deployment of a configuration. The repository can then pull the timestamps from the servers or have the servers push the timestamps to the repository. Based on the issued timestamps, the repository is provided end-to-end metrics with which to identify successful/unsuccessful configuration deployment, errors, inconsistencies, and other performance issues that may occur when deploying the configurations to the servers.

In some embodiments, the repository includes alert functionality to automatically notify users when specified conditions are satisfied. In some embodiments, the alerts are used to notify users when performance for a newly deployed configuration is less than a previously deployed configuration. In some such embodiments, the repository polls performance data from the servers to which the configurations are deployed and the performance data is compared to the performance data stored with previous instances of the configurations as part of the revision history in the repository. When the performance falls below a specified threshold (e.g., new configuration performs worse than a previous configuration), an alert is issued to notify the user of the condition. In some embodiments, alerts can be used to identify errors occurring on a server to which a configuration is deployed.

In some embodiments, the repository includes functionality for users to set custom triggers to issue alerts when user specified conditions are met. The triggers include pre-deployment and post-deployment triggers, where the triggers are autonomously executed at either the repository or different sets of servers to which configurations associated with the triggers are deployed. As some examples, pre-deployment triggers can be set to (1) identify which servers to deploy a configuration to, (2) invoke syntax tests, (3) invoke integrity tests, and (4) invoke simulation tests before changes committed to a configuration are deployed to one or more servers. As some examples, post-deployment triggers can be set to (1) invoke server functions, (2) invoke performance tests, and (3) invoke consistency tests after the repository deploys a configuration to a set of servers.

Different frameworks for the configuration management repository are provided to scale the configuration management functionality for distributed platforms of varying sizes. A centralized configuration management repository manages configurations for a distributed platform that includes a single CDN. A distributed master slave repository framework is provided to manage configurations for an Open CDN distributed platform that includes multiple CDNs that interoperate by exchanging capacity with one another such that a customer configuration can be simultaneously deployed across capacity of at least two different CDNs.

BRIEF DESCRIPTION OF THE DRAWINGS

In order to achieve a better understanding of the nature of the present invention, a preferred embodiment for the configuration management repository will now be described, by way of example only, with reference to the accompanying drawings in which:

Figures 6, 7:
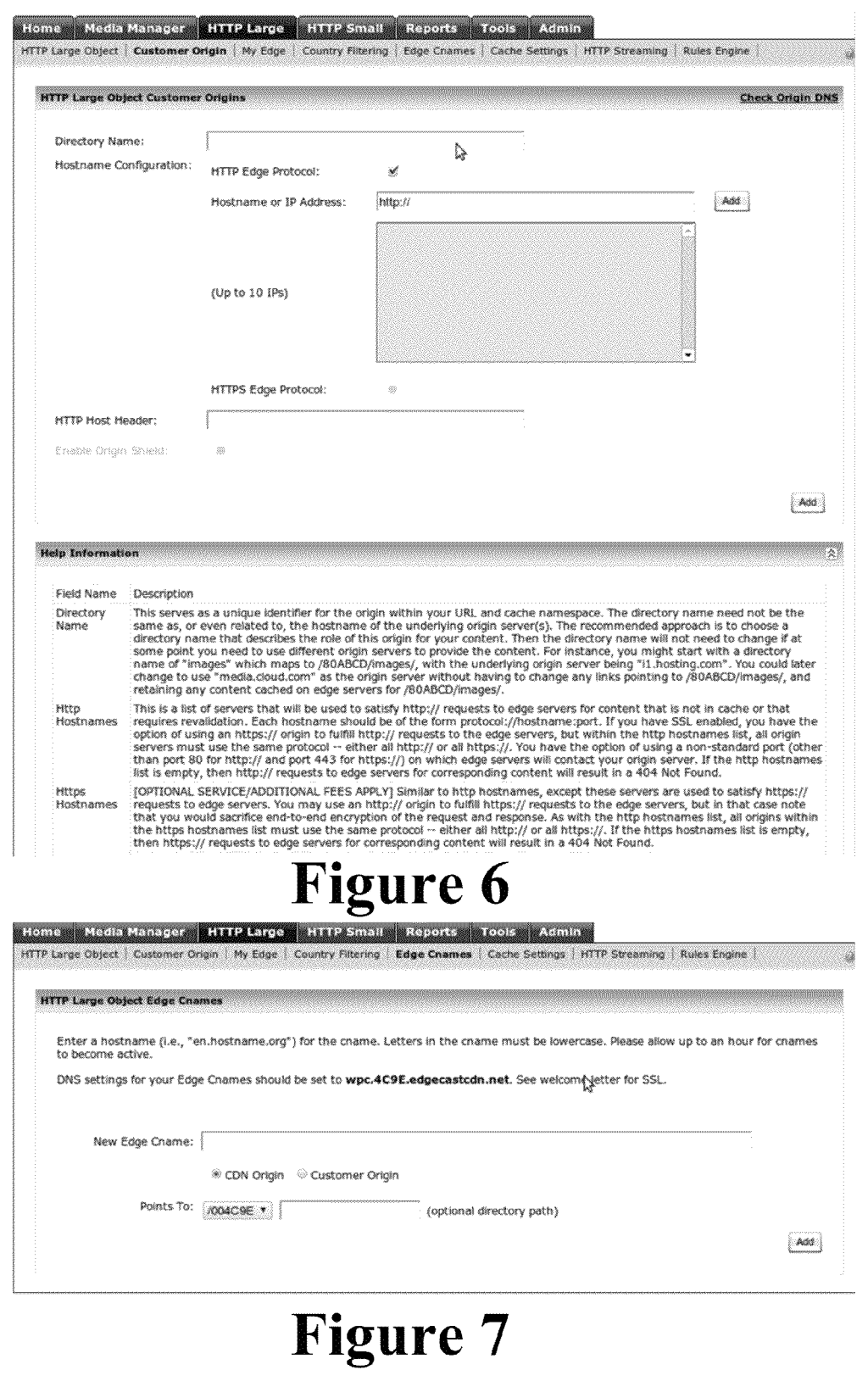

FIGS. 4-7 illustrate various interfaces of the GUI through which users can specify or modify a customer configuration in accordance with some embodiments.

FIG. 9 conceptually illustrates the integrity checks that are performed by the function processor in accordance with some embodiments.

DETAILED DESCRIPTION

In the following detailed description, numerous details, examples, and embodiments of the configuration management repository is set forth and described. As one skilled in the art would understand in light of the present description, the configuration management repository is not limited to the embodiments set forth, and the configuration management repository may be practiced without some of the specific details and examples discussed. Also, reference is made to the accompanying figures, which illustrate specific embodiments in which the reporting system can be practiced. It is to be understood that other embodiments can be used and structural changes can be made without departing from the scope of the embodiments herein described.

I. Overview

The configuration management repository manages, stores, and deploys configurations to the servers of a distributed platform. The distributed platform can include servers that are operated by a single service provider. A content delivery network (CDN), such as the ones operated by Edgecast, Akamai, etc., is an example of a distributed platform that includes servers that are operated by a single service provider. Alternatively, the distributed platform can include servers that are operated by multiple different service providers. The Open CDN platform represents a distributed platform where servers are operated by different service providers. Specifically, the Open CDN platform represents a platform in which multiple CDNs interoperate by exchanging capacity with one another and by deploying configurations across capacity of two or more CDNs. Servers of various cloud service providers such as Amazon CloudFront, Amazon EC2, and Web.com may also be included in the distributed platform described herein. A more detailed discussion of the Open CDN platform can be found in U.S. provisional patent application 61/524,294 entitled "Open Content Delivery Network Platform with Capacity Exchange" filed Aug. 16, 2011.

In some embodiments, the configuration management repository is integrated as part of an administrative server of a distributed platform, wherein the administrative server performs the configuration functionality for the CDN. In some embodiments, the configuration management system is a standalone system that operates independent of the administrative server.

Figure 1:
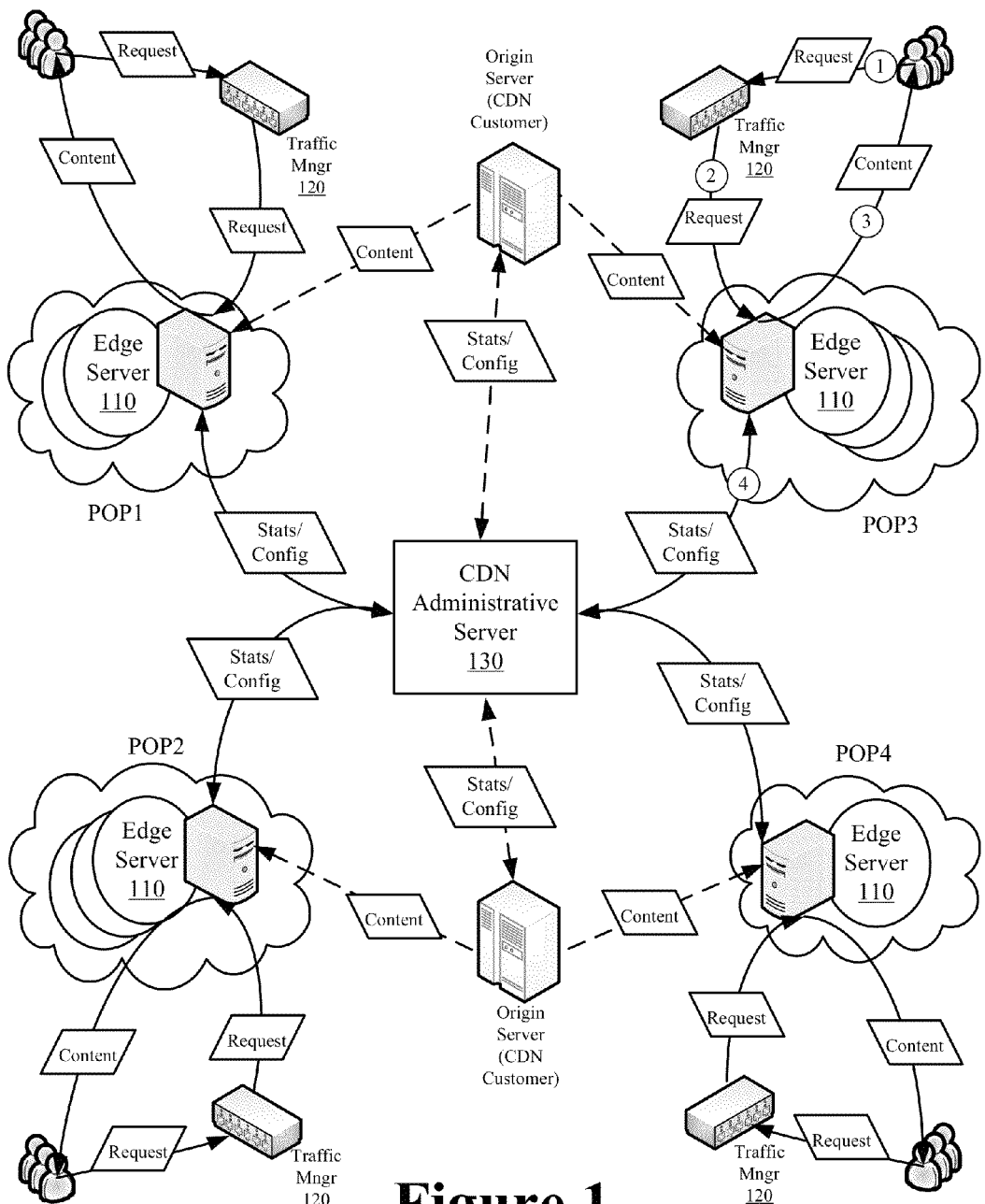
FIG. 1 illustrates a representative infrastructure for some CDNs.
Figure 2:
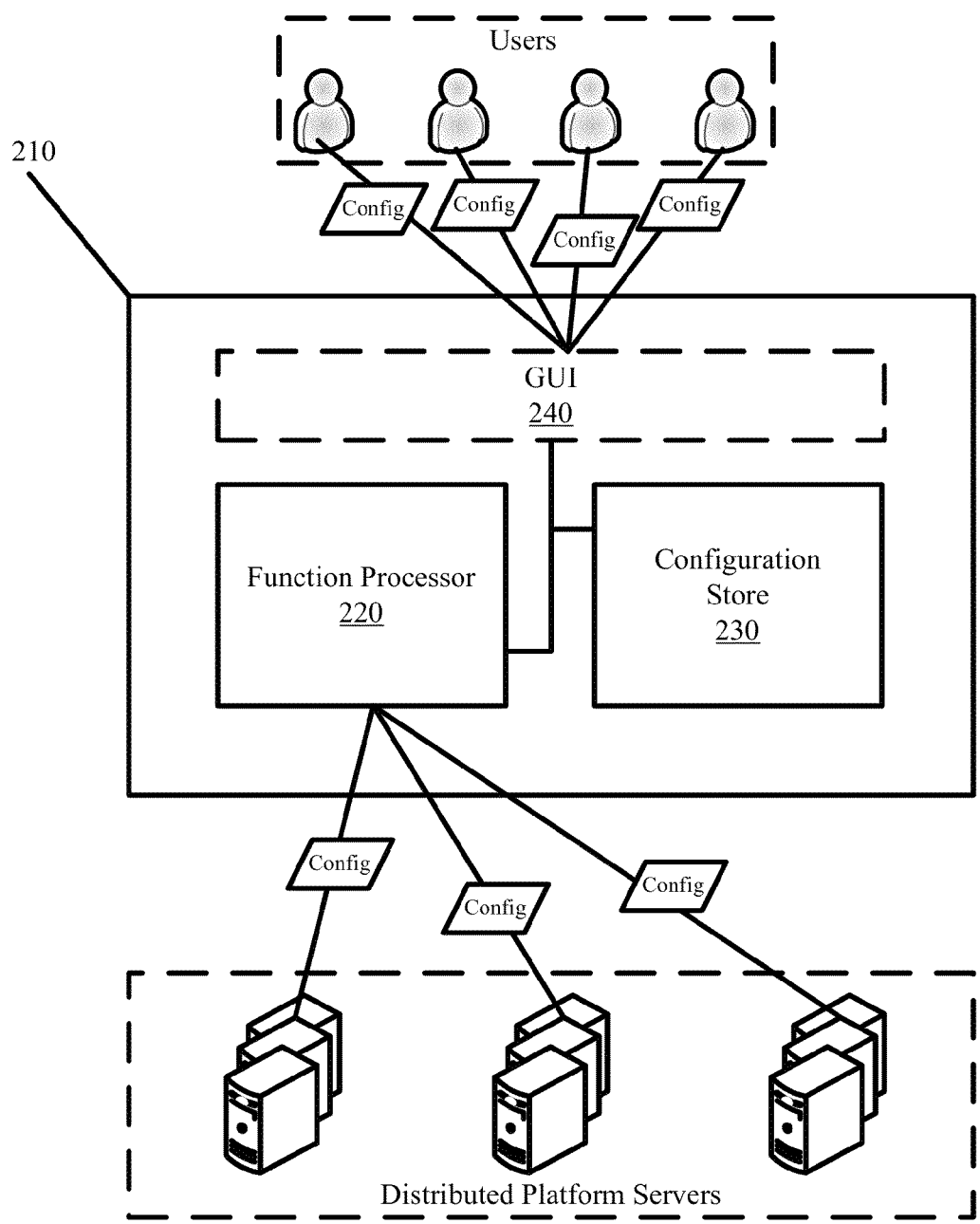
FIG. 2 illustrates components of a configuration management repository that is in accordance with some embodiments.

FIG. 2 illustrates components of a configuration management repository 210 that is in accordance with some embodiments. As shown, the configuration management repository 210 includes a function processor 220 and a configuration store 230. Collectively, the function processor 220 and the configuration store 230 provide the backend functionality for the configuration management repository 210. In some embodiments, the configuration management repository 210 optionally includes a graphical user interface (GUI) 240 to provide frontend functionality.

In some embodiments, the function processor 220 executes the functionality for adding, deleting, and modifying the various configurations of the distributed platform that are stored to the configuration store 230. The function processor 220 further deploys some or all of the configurations to the appropriate servers of the distributed platform while maintaining integrity and consistency of the configurations in storage and in deployment. In some embodiments, deployment of the configurations includes having the function processor push the configurations to the appropriate servers or having the servers retrieve the appropriate set of configurations from the configuration store 230.

The configuration store 230 may be implemented using known storage structures, files, databases, or any other data storage solution. In some embodiments, the configuration store 230 stores different hierarchical sets of configurations, the zero or more groups that each configuration is associated with, and the one or more groups that each server of the distributed platform is associated with. The grouping identifies which configurations are deployed to which servers and this identification facilitates the automated configuration deployment by the configuration management repository.

Figure 3:
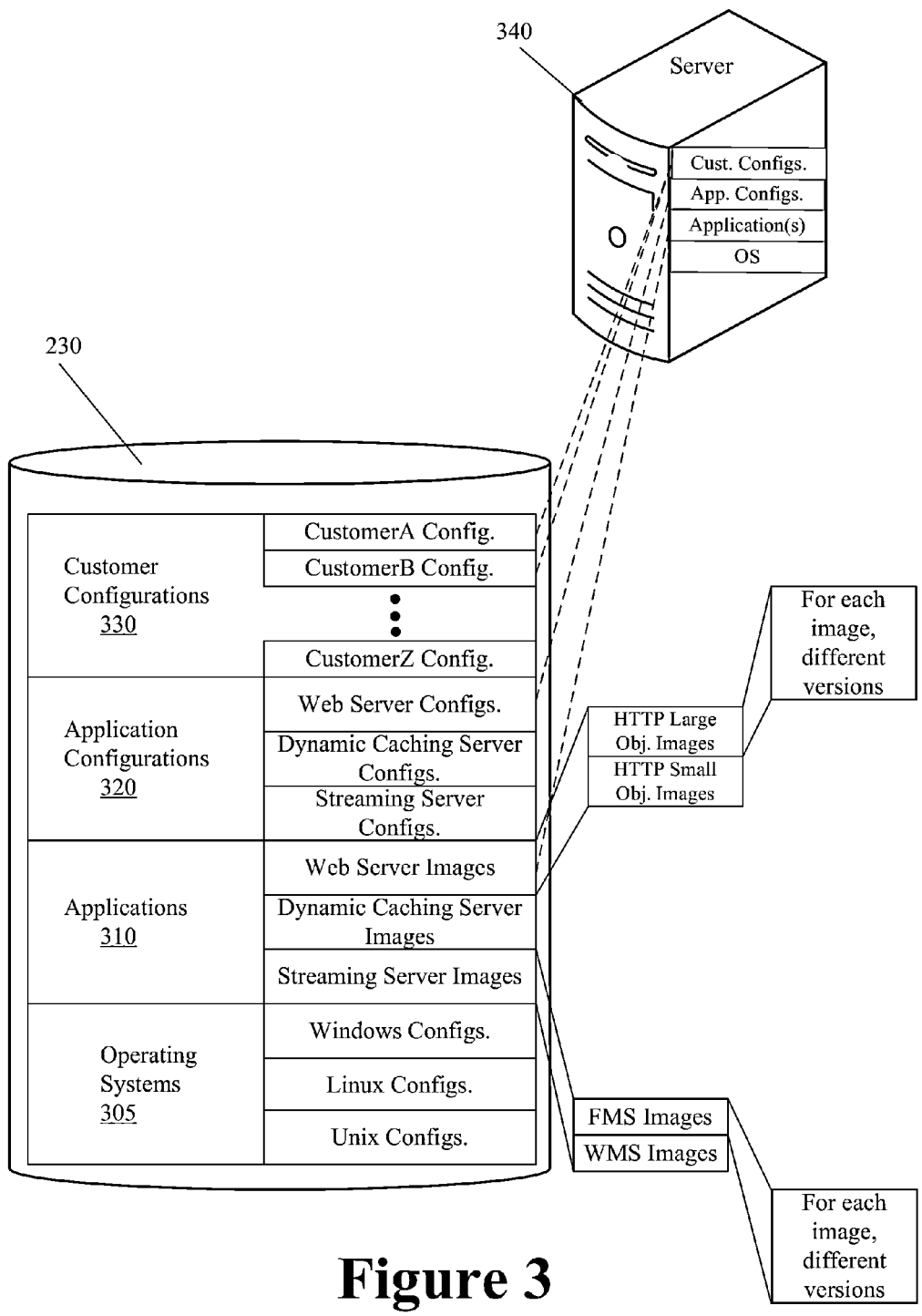
FIG. 3 conceptually illustrates the hierarchical sets of configurations that are stored to the configuration store and that are used to configure a server of the distributed platform in accordance with some embodiments.
Figure 4:
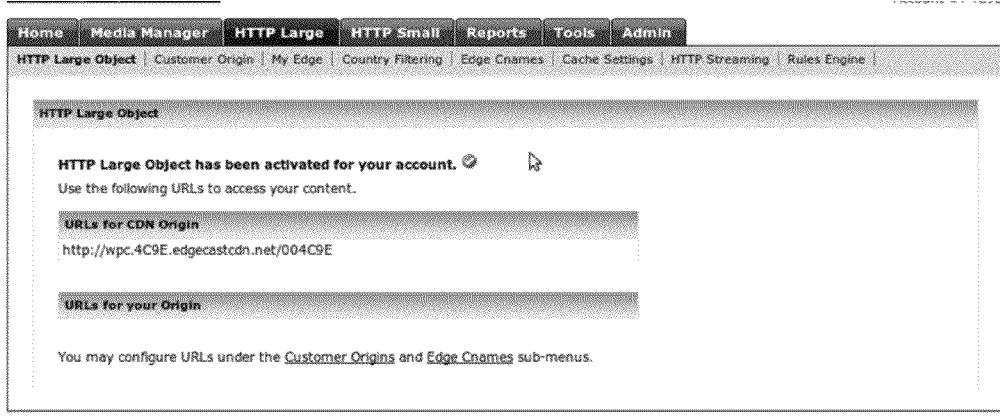
Figure 5:
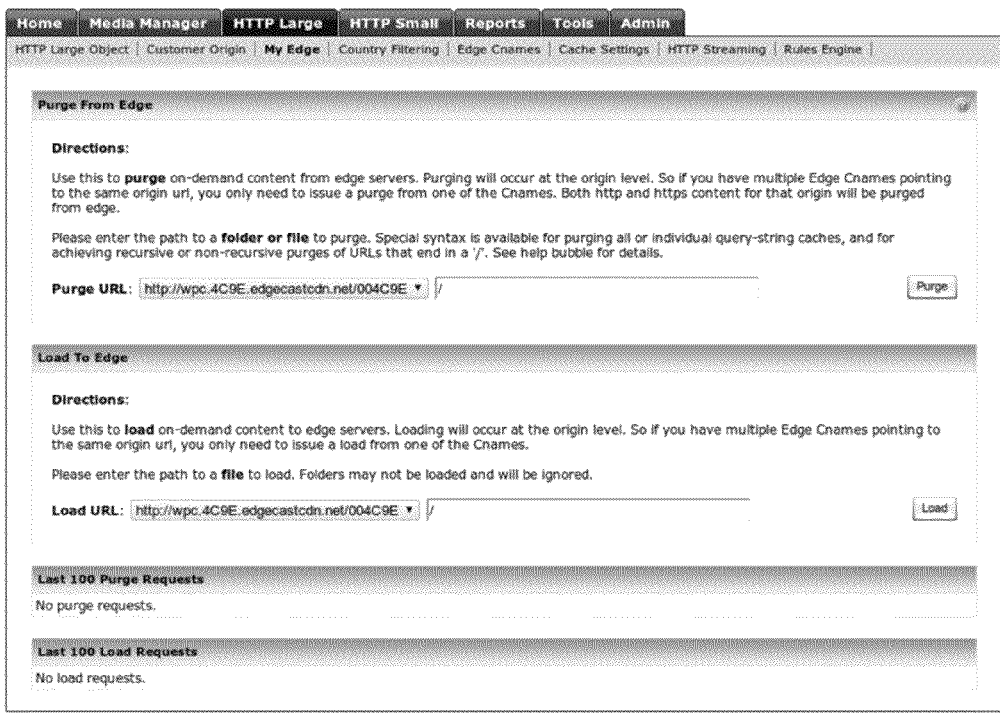

FIG. 3 conceptually illustrates the hierarchical sets of configurations that are stored to the configuration store 230 and that are used to configure a server 340 of the distributed platform in accordance with some embodiments. The hierarchical sets of configurations include different sets of operating system configurations 305, applications 310, application configurations 320, and customer configurations 330. The hierarchy of configurations is established because certain customer configurations require that a certain operating system first be installed, before certain applications can be installed and configured for that operating system, and before certain customer configurations can be executed or otherwise run on the applications.

In some embodiments, the operating system configurations 305 are part of the base configuration for the servers of the distributed platform. The operating system configurations 305 include different operating systems, kernel modifications, security settings, disk scheduling, etc. for the servers of the distributed platform. Some different operating systems for the servers of the distributed platform include Microsoft Windows®, Apple Mac OS®, and various Linux and Unix distributions. In some embodiments, each server of the distributed platform is configured with a script that specifies the networking parameters for communicably coupling the server to the distributed platform when the server is first brought online. Once the server communicates with the configuration management repository, the configuration management repository deploys at least a base configuration to that server. The script may also specify which configurations are to be deployed to the server such that the server retrieves the configurations from the configuration management repository in an automated manner. In some other embodiments, the base configurations (i.e., operating system configurations) are manually deployed to the servers before the servers are brought online.

In some embodiments, the different sets of applications 310 include installation images for Adobe® Flash® Media Server (FMS) for streaming of multimedia content, Windows® Media Services (WMS) also for streaming of multimedia content, web server applications (e.g., Apache and Microsoft Internet Information Services (IIS)) for the delivery of "HTTP small objects" that are objects generally under one megabytes in size, web server applications for the delivery of "HTTP large objects" that are objects generally over one megabyte in size, and application delivery servers for the serving of dynamic content. It should be apparent that the configuration store 230 of the configuration management repository may include additional or alternative installation images other than those enumerated above. Additionally, the configuration store 230 may store different versions of the same installation image. For example, the configuration store 230 stores different FMS versions such as Flash Media Streaming Server 4, Flash Media Interactive Server 4, and Flash Media Enterprise Server 4. For each installation image, the configuration store 230 may store prior and current versions including version 2.0, 3.0, and 4.0 of an FMS application as one example.

In some embodiments, the different sets of application configurations 320 include settings and attributes for each of the installation images. The application configurations are used to customize the operation of the applications on the different servers of the distributed platform. The customizations include setting of paths, ports, security, and virtual hosts as some examples.

As noted above, a customer configuration of the set of customer configurations 330 generally identifies the content that is to be delivered by the CDN, the amount of CDN resources to provision, and the caching policies for the provisioned resources as some examples. Therefore, when a particular customer configuration specifies streaming of a particular WMS compatible stream, the particular customer configuration should be deployed to a server that is configured with a WMS installation and a WMS configuration.

A configuration is associated with zero or more groups when it is first added to the configuration store. The group identifies the servers of the distributed platform to which the configuration is to be deployed. The group associated with a configuration can be changed at any time so that it is deployed to a different server, deployed to an additional server, or is removed from a server.

The distributed platform administrator may specify which servers are associated with which groups. However, it is often the case that different sets of servers will be configured to perform specific functionality such as caching HTTP large objects, caching HTTP small objects, streaming media, etc. Therefore, the servers that perform the same functionality are usually associated with the same group. In this manner, one set of servers of the distributed platform may be associated with a group that streams Flash based content, another set of servers of the distributed platform may be associated with a group that caches HTTP large objects, and another set of servers of the distributed platform may be associated with a group that caches HTTP small objects. Customer configurations that specify delivery of Flash based media content will then be associated with the group that includes the set of servers that is associated with the streaming of Flash based content.

Servers may be associated with different groups based on different levels of granularity. For example, a first set of servers configured for the streaming of Flash based content may be associated with a first group and a second set of servers configured for the streaming of Flash based content may be associated with a second group, where the first group comprises servers that are located in North America and the second group comprises servers that located in Europe.

The function processor 220 and the configuration store 230 implement the backend functionality for the configuration management repository. As described above, such functionality can be used to automatically deploy configurations to servers of any distributed platform. Alternatively, the backend functionality can be seamlessly integrated with existing deployment facilities of a CDN. In some such embodiments, the configuration management repository pushes the configurations to the deployment facilities that then perform the deployment to the servers of the CDN.

The backend functionality can also be integrated with existing configuration management frontends of different CDNs. For instance, some CDNs already provide a portal that customers can interact with in order to specify or upload their respective customer configurations. Once customer configurations have been specified or uploaded, they can be stored to the configuration store of the configuration management repository using the various functions that are performed by the function processor wherein the frontend invokes the proper functions on behalf of the user. Other frontends allow users the ability to directly invoke the functionality of the function processor.

In some embodiments, the configuration management repository is enhanced with its own frontend that includes the GUI 240. The GUI 240 provides interfaces with which different users including customers and developers can specify or upload configurations. Once customer configurations have been specified or uploaded, the GUI 240 can be used to invoke the various functions of the function processor to store the configurations to the configuration store and to deploy the configurations to the appropriate servers of the distributed platform. FIGS. 4-7 illustrate various interfaces of the GUI 240 through which users can specify or modify a customer configuration in accordance with some embodiments.

II. Configuration Management Repository Operation

The function processor of the configuration management repository provides (1) checkout, update, commit, merge, revert, diff, branch, version tagging functions and (2) integrity checks to ensure that modifications committed by two separate users that checked out the same configuration at some overlapping time can be safely merged to a master instance of that configuration. It should be apparent to one of ordinary skill in the art that other embodiments may include additional functions in addition to or instead of those enumerated herein. In some embodiments, the functions resemble those of source code and document repositories (e.g., Microsoft Visual SourceSafe, Concurrent Versions System (CVS), and Subversion (SVN)). However, the functions provided by the function processor are specifically adapted for the management of configurations for servers of a distributed platform and, more particularly, are adapted to allow the configuration management repository to automatedly deploy configurations across the servers of the distributed platform while maintaining configuration integrity and consistency in the repository and across the servers. In this manner, the configuration management repository operates differently than source code and document repositories. Furthermore, the configuration management repository provides a function set that other repositories lack and the configuration management repository implements the function set in a manner that other repositories were never designed to support.

To access the functions of the configuration management repository, a user first logs in to the configuration management repository using the GUI or other frontend of the distributed platform. The log in procedure may require the user to provide a username and password or some other identifier to identify the user as either a customer of the distributed platform or a developer. A customer of the distributed platform is one who has a customer configuration deployed to at least one server of the distributed platform. In other words, a customer is one who has registered for some service of the distributed platform. A developer is someone who develops and maintains an application or application configuration that is stored to the configuration store of the configuration management repository. In some embodiments, a distributed system administrator manages the various application configurations instead of one or more developers.

The log in procedure identifies which configurations in the repository the user is provided access to. This ensures that one customer is not allowed to modify a configuration of another customer or a configuration of a developer improperly. Once a user successfully logs in, the configuration management repository presents the configurations that are accessible by the user. The user can then add, delete, or modify configurations either directly through the GUI of the configuration management repository or indirectly through some other frontend that communicably couples to the backend of the configuration management repository.

The checkout function is invoked in advance of a previously stored configuration being modified. The checkout function furthers configuration integrity by ensuring that a master instance of a configuration is never directly modified. Instead, modifications are made to a copy of the configuration and once the modifications are committed, the modifications are merged with the master instance. An additional benefit is that the function processor can perform integrity checks prior to merging the modifications with the master instance.

One or more selected configurations are used as parameters for the checkout function. Then when the checkout function is invoked, the function processor retrieves a copy of the selected configurations from a master version of the configurations that are stored to the configuration store. In some embodiments, the checkout function is invoked by a user using the GUI or other frontend.

When a configuration is checked out, the function processor sets a flag for the master instance of that configuration in the configuration store. The flag identifies which users have checked out that configuration. As will be explained below with reference to the commit function, the flags in conjunction with integrity checks performed by the function processor, allow two or more users to check out the same configuration at some overlapping time, modify that configuration, and then commit the changes in a non-conflicting manner so that the configuration need not be locked or exclusively checked out by a single user.

When a configuration is checked out in some embodiments, the function processor passes a retrieved copy of the configurations to a frontend where the configuration copy is remotely made available to the user. The user can modify the configuration through the frontend. Any modifications are entered to the configuration copy rather than the stored master instance of the configuration. When a configuration is checked out in some other embodiments, the function processor passes the retrieved copy of the configuration to the machine of the user performing the checkout. The user can then modify the checked out configuration copy locally on his/her machine.

Invocation of the commit function causes the function processor to merge the modifications that have been made to a configuration copy with the master instance of that configuration in the configuration store. Before merging the modifications, the function processor performs an integrity check. The integrity check ensures that the modifications being committed do not conflict with modifications that other users may have earlier committed to the master instance for that configuration when that configuration is checked out by multiple users at some overlapping time.

Figure 8:
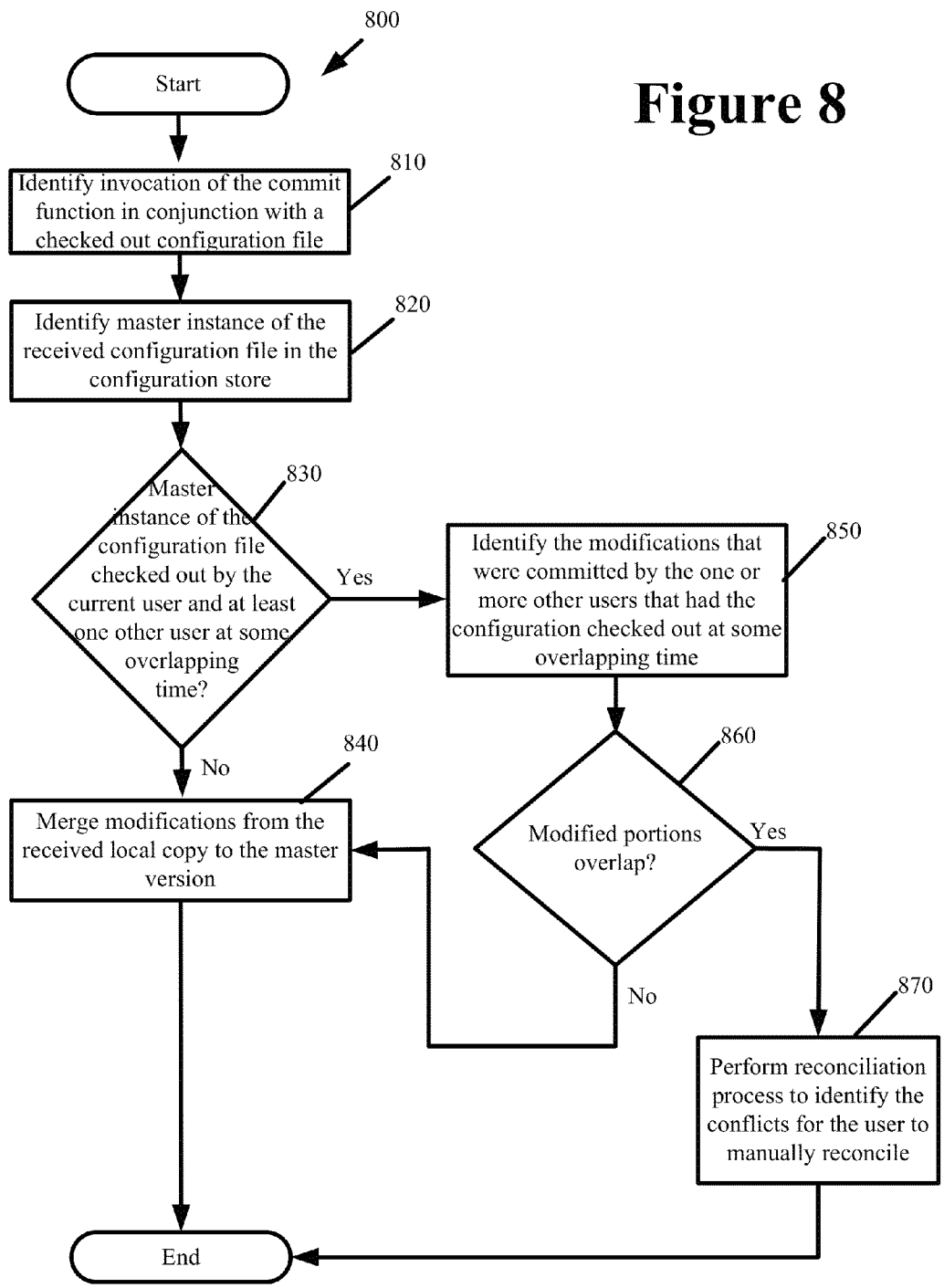
FIG. 8 presents a process describing the integrity check that is performed by the function processor in accordance with some embodiments.

FIG. 8 presents a process 800 describing the integrity check that is performed by the function processor in accordance with some embodiments. The process 800 begins when the commit function is invoked (at 810) in conjunction with a checked out configuration file. The process identifies (at 820) the master instance of the received configuration in the configuration store. The process determines (at 830) whether the master instance of the configuration was or is checked out by the current user and at least one other user at some overlapping time. This determination is made by comparing the flags that have been set for the master version of the configuration file. In some embodiments, a set flag can have one of two states: checked out by an identified user and checked in by an identified user. The checked out flag is set when the configuration is checked out by a particular user that is identified using some identifier or other similar means. The checked in flag is set when the configuration is committed or checked in by a first user and a checked out flag for the same configuration identifying a second user is set. The checked in flag therefore indicates that the file was simultaneously checked out at some overlapping time. If no other flags except for the checked out flag for a particular user are set when the commit function is invoked for the particular user, then the function processor does not set the checked in flag, but clears all flags for that configuration.

If the configuration was not simultaneously checked out by at least two users at some overlapping time, the process merges (at 840) the modifications from the received copy of the configuration to the master version of the configuration in the configuration store and the process ends. However, if the configuration was checked out by at least two users at some overlapping time, the process identifies (at 850) the modifications that were committed by the one or more other users that had the configuration checked out at some overlapping time. To do so, the configuration store has a revision history for all committed changes. The revision history identifies which user committed which modifications and at what time the modifications were made. The process then identifies the portions of the configuration that were earlier modified by the users that checked out that configuration at the current overlapping time. The portions are identified using the diff function that is described further below. It should be apparent that the other users may have not yet committed their changes or did not make any changes to the checked out configuration. In such cases, the process merges the modifications to the master version as per step 840. When earlier modified portions are identified, the process compares (at 860) the portions modified by the user presently invoking the commit function with the identified earlier modified portions to determine if the modified portions overlap. When the portions are non-overlapping and therefore non-conflicting, the process reverts to step 840 to merge the modifications from the received copy to the master version and the process ends. When the portions are overlapping and therefore conflicting, the process performs (at 870) a reconciliation process to identify the conflicts and have the user manually reconcile the conflicts by approving the last committed modification made a different user, approving the current modification made by the current user, rejecting all modifications, or manually editing the modification. After reconciliation, the process ends.

FIG. 9 conceptually illustrates the integrity checks that are performed by the function processor in accordance with some embodiments. This figure illustrates two instances in which two users 910 and 920 check out the same configuration 930 at some overlapping time and that commit changes (e.g., 940, 950, 960, and 970) to that configuration 930. The first set of changes 940 and 950 are not conflicting since they modify different parameters of the configuration 930. However, the second set of changes 960 and 970 are conflicting because both users 910 and 920 attempt to modify parameter 980. Therefore, a reconciliation process is performed whereby the user that is last to commit the changes must manually determine which modification to keep or whether the modifications should both be rejected.

In some embodiments, the function processor performs other integrity checks in addition to or instead of the integrity checks presented above when the commit function is invoked. One such integrity check involves ensuring that the instance of the configuration being committed by the user is a copy of the latest version of the master instance stored to the repository. When the commit function is invoked, a version of the checked out configuration is compared against a version for the master instance stored to the repository. The version of the checked out configuration may be stored as a flag to the repository when the configuration is checked out. Alternatively, the version of the checked out configuration may be inserted into metadata of the checked out configuration and passed to the repository when the commit function is invoked. If the version of the checked out configuration matches the version of the master instance, then the user can commit the modifications made to the checked out configuration to the master instance. However if the versions do not match, then changes from the master instance are applied to the copy of the checked out configuration. In some embodiments, applying the changes first involves identifying the differences between the checked out copy and the master instance of the configuration. The user then reconciles the differences to the copy of the checked out configuration. Thereafter, the commit function may be invoked and the master instance is updated with the modifications in the checked out configuration.

In some embodiments, invoking the merge function automatically updates the copy of a configuration that is checked out by a user with the latest version of the master instance. In this manner, the user need not commit or otherwise check in a configuration in order to receive the latest version of that configuration. When the merge function is invoked, the function processor compares the versions of the copy of the checked out configuration with the master instance in the repository and any differences are reconciled to the copy of the checked out configuration.

In some embodiments, modifications committed to a particular configuration are not immediately deployed to servers of the distributed platform that are deployed with that particular configuration until a scheduled update process runs (e.g., every ten minutes) or until the update function is invoked. In some embodiments, the GUI or other frontend automatically invokes the update function after invoking the commit function. In some embodiments, the servers of the distributed platform are configured to invoke the update function at particular intervals.

To identify which servers to update with the modified configuration, each configuration that is stored to the configuration store is associated with zero or more groups and each server of the distributed platform is associated with one or more of the groups. When a configuration is updated and the modifications in that updated configuration are to be deployed, the function processor identifies the group that is associated with the configuration. Next, the function processor identifies the servers that are associated with the identified group. The function processor then deploys the updated configuration to the identified servers. Deploying the updated configuration includes passing the updated configuration to the identified servers with commands to cause the servers to update their existing configuration with the modifications of the updated configuration. In some embodiments, deploying a configuration involves the function processor establishing a connection (e.g., a secure connection) with the one or more servers to which the configuration is to be deployed. A handshaking process may be used to indicate that the function processor is passing an updated configuration to the servers. Upon receiving the updated configuration, scripts running locally on the servers install the configuration and alter any performance parameters to make the configuration operational. In this manner, the configuration management repository facilitates the automated configuration of servers of a distributed platform. Moreover, the configuration management repository automatically ensures the integrity and consistency of the configurations that are deployed to the servers of the distributed platform. Specifically, the configuration management repository automatically updates the appropriate set of servers with the same updated configuration such that the configuration across the edge servers are in sync at all times. This is in contrast to manually configured servers or portals that interface with a single server at any given time.

In some embodiments, invoking the update function does not overwrite custom modifications that are made to the configurations of one or more specific servers to which the configurations are deployed. In some such embodiments, when the configuration management repository deploys an updated configuration to a set of servers, the deployment does not overwrite the entirety of that configuration on the set of servers. Rather, the deployment identifies the modifications that were made to the configuration and only those modifications are made to the already deployed configurations. In this manner, customizations that are made to one or more specific servers can be retained while still utilizing the automated configuration deployment functionality of the configuration management repository.

In some other embodiments, invoking the update function overwrites existing configurations on the servers. However, customizations that are made to an existing configuration of one or more specific servers can be retained during the update by merging the customizations with a newly deployed configuration.

Figure 10:
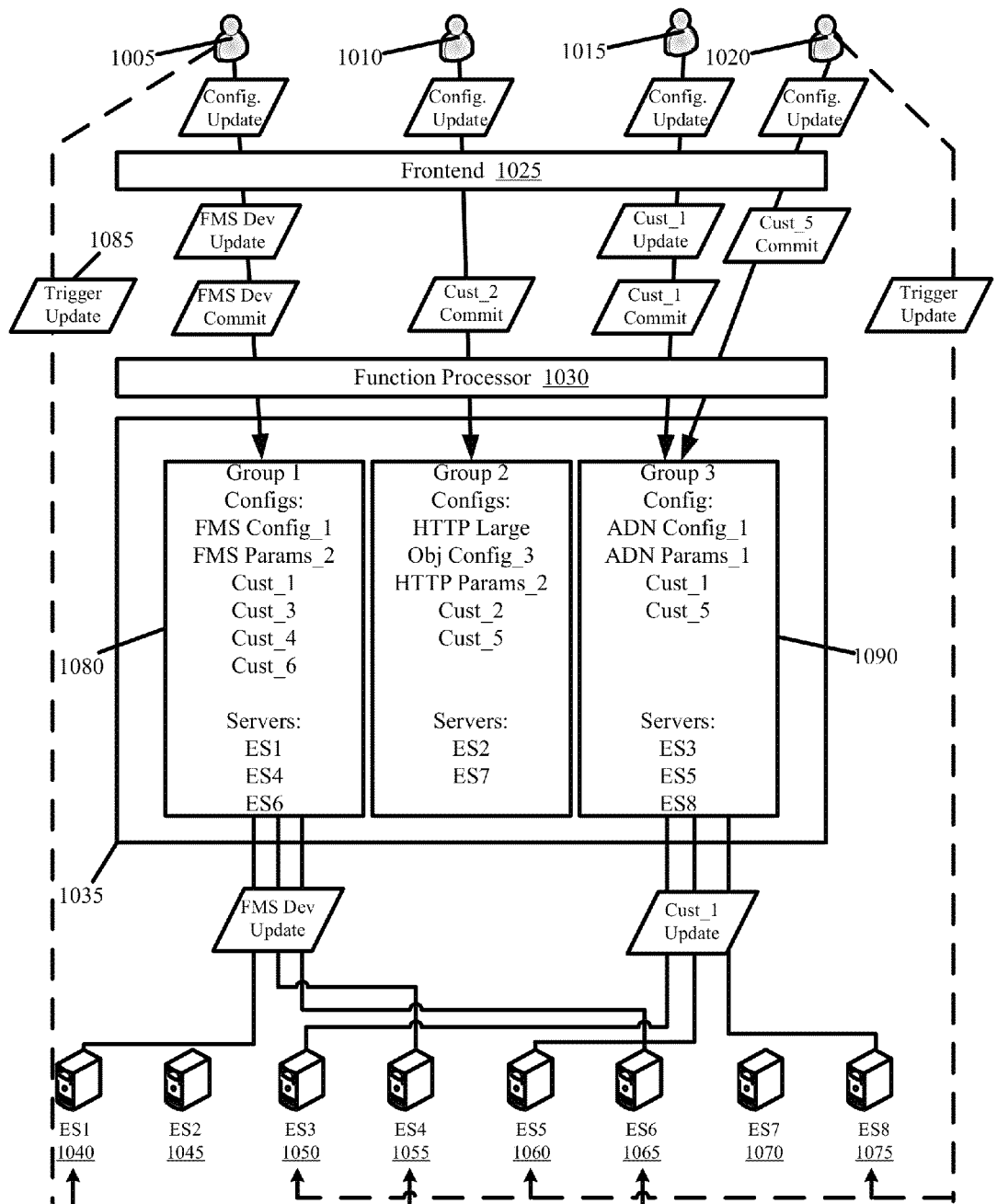
FIG. 10 conceptually illustrates the automated configuration deployment that is performed by the configuration management repository in accordance with some embodiments.

FIG. 10 conceptually illustrates the automated configuration deployment that is performed by the configuration management repository in accordance with some embodiments. The figure illustrates four users 1005, 1010, 1015, and 1020, frontend 1025, function processor 1030 of the configuration management repository, configuration store 1035 of the configuration management repository, and servers 1040, 1045, 1050, 1055, 1060, 1065, 1070, and 1075 of a distributed platform.

As shown, the first user 1005 modifies a configuration for an FMS application using the frontend 1025 and the user triggers an update (see 1085) to cause the modifications to be deployed to the servers 1040, 1055, and 1065. The frontend 1025 conveys the modifications to the function processor 1030 by invoking the commit and update functions. The commit function causes the function processor 1030 to merge the modifications made to the configuration of the first user 1005 to a master instance of the configuration in the configuration store 1035. The update function causes the function processor 1030 to deploy the modifications to the servers that are deployed with the configuration of the first user 1005. To do so, the function processor 1030 identifies the group 1080 that is associated with the configuration for the FMS application of the first user 1005. From the identified group 1080, the function processor 1030 identifies that servers 1040, 1055, and 1065 are deployed with the configuration of the first user 1005. The function processor then deploys the configuration modifications to the servers 1040, 1055, and 1065.

The second user 1010 modifies a customer configuration using the frontend 1025. However, the second user 1010 does not trigger an update and the frontend 1025 does not invoke the update function of the function processor 1030. Accordingly, the function processor 1030 does not deploy the modifications made to the customer configuration of the second user 1010 to any of the servers 1040-1075.

The third user 1015 and the fourth user 1020 each modify a customer configuration that is associated with group 1090 and that is deployed to servers 1050, 1060, and 1075. However, the frontend 1025 only invokes the update function for the modifications to the customer configuration of the third user 1015 such the function processor 1030 only deploys the modifications made to the third user's configuration and not the fourth user's configuration to the servers 1050, 1060, and 1070.

An advantage of the configuration management repository is the ability to revert to a previous configuration in the event a newly committed modification breaks a configuration or results in worse performance in the distributed platform. This functionality is accessible using the revert function. When the revert function is invoked, the function processor retrieves an older version of a configuration from the configuration store and the function processor deploys that configuration to the appropriate servers to restore the servers to a known working configuration. To facilitate such functionality, the configuration store does not overwrite a prior configuration that is stored to the configuration store when the commit function is invoked. Instead, the configuration store creates a new instance of the configuration that is stored in conjunction with the prior configuration so that a revision history for the configuration is retained. Each configuration is also marked with the date and time that it is stored to the configuration store and the user that committed the configuration. Each configuration is also stored with a set of performance parameters that identify a realized performance associated with the configuration. The configuration management repository obtains the performance parameters from the servers to which the configuration was deployed. The servers continually monitor configuration performance as part of the distributed platform reporting functionality. Such monitoring is thus adapted for use by the configuration management repository whereby some or all of the monitored performance parameters are stored alongside the configuration in the configuration store.

To invoke the revert function in some embodiments, a user first identifies a configuration that the user wishes to be reverted to a prior version. The function processor retrieves the revision history for the identified configuration and presents the performance parameters for each revision or instance of the configuration that is stored in the configuration store. The user can select a configuration to revert to and have that configuration be deployed to the appropriate servers with the invocation of the revert function.

In some embodiments, the diff function utilizes the revision history of a particular configuration to present modifications that have been committed to that particular configuration. When the diff function is invoked, the function processor compares one version of a configuration to another version of the same configuration and the differences between the two configurations are presented. The diff function can be used to compare a checked out configuration that has been modified on the user's local machine to a previous configuration that is stored to the configuration store. Additionally, the diff function can be used to compare two different stored configurations.

The branch function creates a fork in the repository for a configuration or set of configurations. A first branch resulting from the fork retains the master instance of the configuration and is the primary branch from which other users check out the configuration or the set of configurations. A second branch resulting from the fork stores a copy of the master instance that can be modified separately from the master instance. Users can then make and test modifications separately from the master instance. When the testing is complete, the branch can be merged with the master instance or maintained separately.

The version tag function enables users the ability to specify custom versioning information to include with each version in the revision history of a configuration. By default, the configuration management repository assigns a version number that is incremented with each commit that is invoked for the configuration. Using the version tag function, users can specify their own custom versioning for each committed configuration. For instance, rather than have the repository automatically increment a version number, the user can specify a version that is more descriptive such as "public release 2.0" or "beta release 2.1".

Other functional operations supported by the backend function processor and configuration store include an add function to add a newly specified configuration to the configuration, a delete function to remove a configuration from the configuration store, a modify function to alter the group that a configuration is associated with, and an ignore function to check in a checked out configuration without committing any of the changes to the master instance of that configuration in the configuration store.

In some embodiments, the robustness of the configuration management repository is enhanced by utilizing the servers to compliment the configuration management functions of the repository. The servers can improve upon the functionality of the repository by providing an end-to-end monitoring capability for the repository. The end-to-end monitoring verifies successful deployment of the configurations. Moreover, the end-to-end monitoring identifies other states and conditions that may occur as part of configuration deployment including identification of errors and performance issues as some examples. In this manner, the configuration management repository provides a fully automated system that not only manages the storing of configurations as done by other repositories, but also manages and performs the automated deployment and monitoring of such configurations to servers of a distributed platform.

In some embodiments, the end-to-end monitoring involves independent versioning of the configurations that are deployed to the servers. More specifically, each server issues a timestamp or other versioning to indicate that a configuration has been successfully deployed to the server, wherein a failed deployment does not result in an updated timestamp. In some embodiments, the servers issue timestamps with more granularity. Such granularity can be used to indicate a line-by-line, service-by-service, daemon-by-daemon, or incremental successful deployment of a configuration. In this manner, the repository or a configuration administrator can more readily identify where a configuration update failed and better diagnose the cause of the failure. In addition to or instead of indicating a successful deployment, timestamps can also be used to demarcate other occurrences or states that may occur when as part of configuration deployment. For example, timestamps may be issued to identify when the server stops running an older configuration and begins running an updated version of the configuration to indicate the time needed to update the configuration on that server. The timestamps are therefore independent version numbers that supplement the version numbers for the configurations as maintained by the repository. In some embodiments, the servers run a script or are specifically configured to generate the timestamps for predefined conditions. The timestamps for a configuration deployed to a particular server may be encoded to that configuration to allow for easier access by the repository.

The repository obtains the timestamps from the servers, by pulling the timestamps or by having the servers push the timestamps to the repository. More specifically, the repository may pull the timestamps when it pushes configurations to the servers and may have the timestamps pushed to it when the servers pull the configurations from the repository. Using the timestamps, the repository can autonomously diagnose the state of the configuration at each of the servers. For example, the repository may identify performance or incompatibility issues at a first server when a configuration takes ten times as long to deploy to the first server than to a second server. Similarly, the repository can identify a failed deployment when a configuration is deployed to a server, but the timestamp that is obtained from that server has not been updated after the deployment of the configuration. Upon certain occurrences or states being identified, the repository can issue an alert to notify the user of the occurrence or state. In some embodiments, the repository can automatically revert to a previous version of a configuration (via the revert function) to prevent server downtime as the configuration administrator is notified to correct the configuration.

As noted above, increasing the granularity of the timestamps further increases the number of conditions and states the repository can identify. For example, if a server issues a timestamp for each successfully deployed line of a configuration, then the timestamps can be used to exactly identify which line of the deployed configuration results in an error condition. Similarly, the server may issue a timestamp for each service or daemon that is updated and that is properly restarted such that a failing service or daemon can be easily identified.

In some embodiments, the repository includes mapping rules that convert the timestamp information into human readable states and conditions. In such instances, a configuration administrator can log into the repository and view the states and conditions and perform additional modifications to the deployed configurations as needed. Alternatively, the repository may automatedly issue alerts to the configuration administrator to notify the administrator of the states and conditions. The configuration administrator is then able to address issues that occur on the servers at the time of deployment rather than having to deploy the configurations, independently monitor the servers after deployment, and identify issues from the monitored results manually. As a result of the configuration management repository and the end-to-end monitoring, configuration administrators are provided better debugging tools. Additionally, servers will have better uptime when an error occurs as a result of the configuration administrator being automatedly notified of the error as it occurs. As noted above, the revert function of the configuration management repository can avoid any downtime by automatically reverting to a previous successfully running configuration while the errors in a modified configuration are corrected based on the end-to-end monitoring of the configuration management repository.

In some embodiments, the repository includes alert functionality to automatically notify users when specified conditions are satisfied. In some embodiments, the alerts are used to notify users when performance for a newly deployed configuration is less than a previously deployed configuration. In some such embodiments, the repository polls performance data from the servers to which the configurations are deployed and the performance data is compared to the performance data stored with previous instances of the configurations as part of the revision history in the repository. When the performance falls below a specified threshold (e.g., new configuration performs worse than a previous configuration), an alert is issued to notify the user of the condition. In some embodiments, alerts can be used to identify errors occurring on a server to which a configuration is deployed.

In some embodiments, the repository includes functionality for users to set custom triggers to issue alerts when user specified conditions are met. Users specify the triggers through the frontend. To specify a trigger, a user (1) identifies one or more configurations to monitor, (2) defines one or more conditions for the identified configurations that when satisfied issue the alert, and (3) methods for receiving the alert (e.g., email, text message, or through the frontend). The triggers can be specified to include pre-deployment and post-deployment triggers, where the triggers are autonomously executed at either the repository or different sets of servers. In some embodiments, the triggers are codified in separate configuration files that are deployed to a script or process that is running at the repository or that is running on the servers.

Pre-deployment triggers can be set to monitor for specific conditions in the configurations before changes committed to a configuration are deployed to one or more servers. The conditions for the pre-deployment triggers can be used to identify which servers a committed change to a configuration should be deployed to. Additionally, the conditions for the pre-deployment trigger can be used invoke syntax tests, integrity tests, and simulation tests. A syntax test involves analyzing a configuration to ensure that it is formatted correctly. This may include identifying proper initialization of variables, bounds checking, parameter checking, compilation errors, and the like. Integrity tests and simulation tests can be used to simulate the deployment of the configuration without actually deploying the configuration to a set of deployment servers of the distributed network. This may include deploying the configuration to a software simulator or to one or more test servers of the distributed network. If no errors occur during the simulated deployment, then the condition of the trigger is satisfied and the configuration can be deployed to the proper set of deployment servers. Otherwise, an alert can be issued to the configuration administrator to notify the administrator of performance issues or errors that occurred during simulation and that should be corrected before actual deployment.

Post-deployment triggers can be set to monitor for specific conditions in the configurations after the configurations are deployed to the set of servers. Post-deployment triggers can be set invoke server functions such as starting, stopping, and restarting specific services or daemons before updating a configuration that impacts those services or daemons. Additionally, post-deployment triggers can be set to invoke performance tests and consistency tests. These tests notify a user when performance for a newly deployed configuration is less than the performance for a previously deployed configuration. Such a trigger specifies a condition that obtains performance data from the servers running the modified configuration and the performance parameters that are stored with the revision history for the modified configuration and based on these performance values, the condition for the trigger can determine whether the newly deployed configuration is better performing than a previously deployed configuration. In a similar manner, a trigger can be specified to issue alerts when errors occur on a server to which a configuration is deployed. Such errors may be reported along with the performance parameters that are obtained by the configuration management repository.

III. Configuration Management Repository Integration

The robust configuration management and deployment functionality provided by the configuration management repository is adaptable for distributed platforms of differing sizes. Different implementation frameworks allow the configuration management repository to scale to handle increased demand as a result of increased numbers of users specifying and modifying configurations, increased numbers of configurations that are managed by the repository, and increased numbers of servers to which the configurations are deployed. Accordingly, the different implementation frameworks can be used to accommodate the configuration complexities of different distributed platforms including the configuration complexities of a single CDN as well as the configuration complexities of an Open CDN platform. The Open CDN platform facilitates a federated interoperation of multiple CDNs. The Open CDN platform allows the multiple CDNs to exchange capacity with one another. In so doing, a first CDN can acquire capacity of a second CDN and deploy a customer configuration across capacity of both the first and second CDNs. Accordingly, when the configuration management repository is integrated in the Open CDN platform, the configuration management repository can be scaled to support the users, configurations, and servers of the entire Open CDN platform. The United States provisional patent application entitled "Open Content Delivery Network Platform with Capacity Exchange" having Ser. No. 61/524,294 with a filing date of Aug. 16, 2011, further describes the Open CDN platform and the contents of the provisional patent application are incorporated herein by reference.

Figure 11:
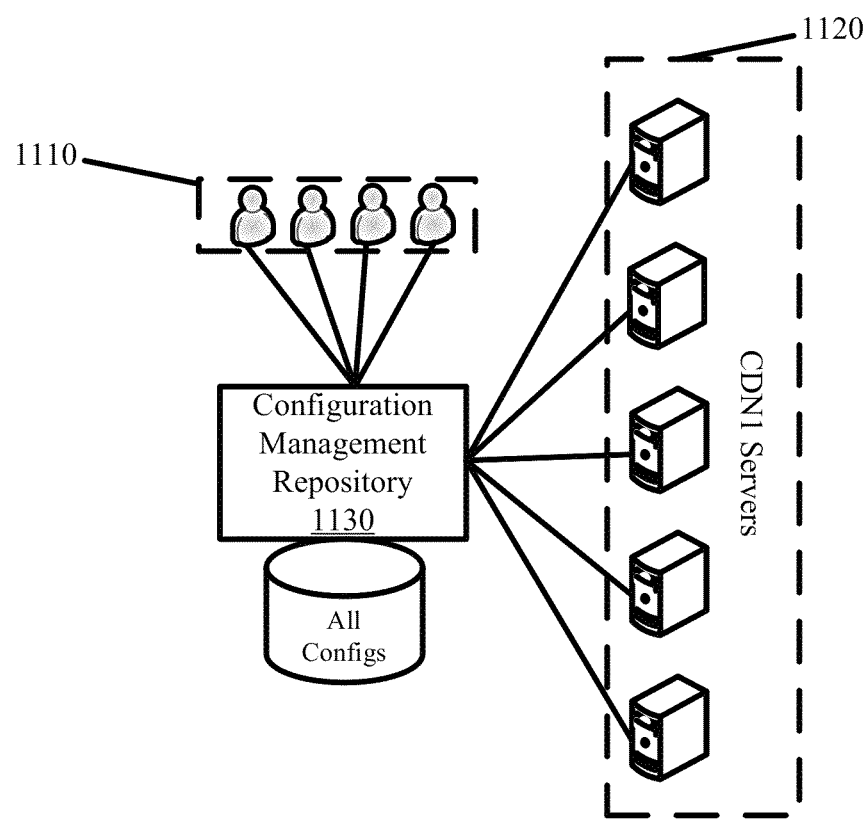
FIG. 11 illustrates a framework for integrating the configuration management repository of some embodiments with an independently operated CDN.

FIG. 11 illustrates a framework for integrating the configuration management repository of some embodiments with an independently operated CDN. This figure illustrates a set of users 1110, a set of servers 1120 that are operated by a first CDN service provider (CDNSP), and the configuration management repository 1130 of some embodiments. The set of users 1110 include customers with customer configurations that are deployed to different servers of the set of servers 1120. Additionally, the set of users 1110 may include developers whose applications and application configurations are also deployed to different servers of the set of servers 1120.

In this figure, a single centralized configuration management repository 1130 is presented to manage the potentially hundreds of concurrent users in the set of users 1110 that may specify and modify the potentially hundreds of configurations for the set of servers 1120. The set of users 1110 interface either directly or indirectly with the configuration management repository 1130 to specify and modify configurations. The configuration store of the configuration management repository 1130 stores the configurations while the function processor deploys the configurations across the set of servers 1120.

However, as the number of users, configurations, and servers increases in an Open CDN platform, some embodiments modify the framework of FIG. 11 to scale the configuration management repository so that it is better able to handle the increased demand.

Figure 12:
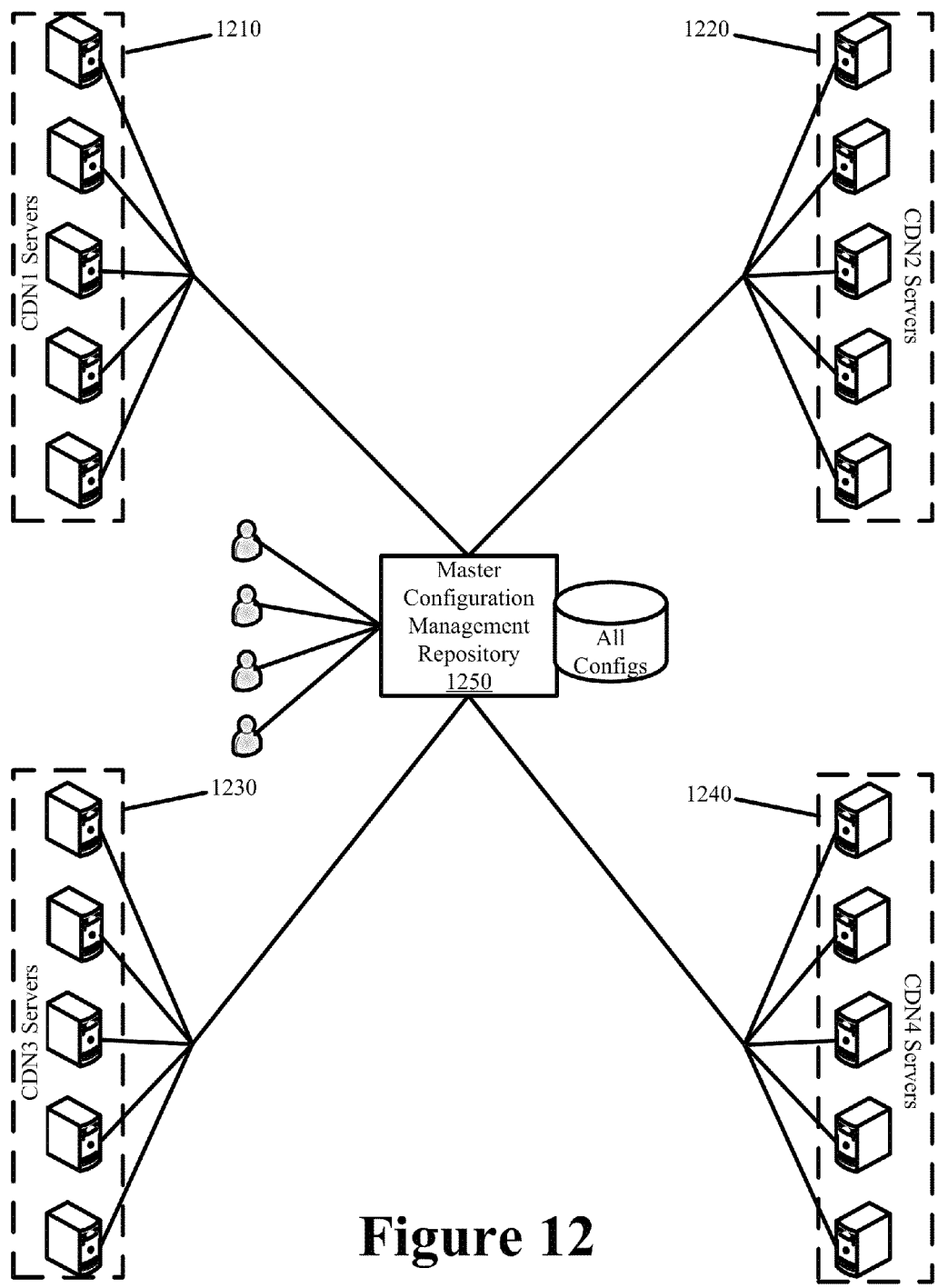
FIG. 12 illustrates a framework for integrating the configuration management repository of some embodiments with an Open CDN platform.

FIG. 12 illustrates a centralized framework for integrating the configuration management repository of some embodiments with an Open CDN platform. In this figure, the Open CDN platform is comprised of a first set of servers 1210 that are operated by a first CDNSP, a second set of servers 1220 that are operated by a second CDNSP, a third set of servers 1230 that are operated by a third CDNSP, and a fourth set of servers 1240 that are operated by a fourth CDNSP. Additionally, a master configuration management repository 1250, also referred to as the master repository 1250, is provided to manage the configurations for each of the first, second, third, and fourth set of servers 1210-1240 that participate in the Open CDN platform.

In this framework, customers of the CDNSPs utilize an interface to the master repository 1250 to specify, upload, modify, and deploy configurations irrespective of whether the configurations are to be deployed to servers operated by a single CDNSP or servers that are operated by two or more CDNSPs. In some embodiments, the master repository 1250 internally maintains which servers of the first, second, third, and fourth sets of servers 1210-1240 are associated with each managed configuration. In some embodiments, the master repository obtains such information from a capacity exchange or other component of the Open CDN platform. The master repository 1250 communicably couples to the different sets of servers 1210-1240 and deploys the configurations to the appropriate sets of servers.

Figure 13:
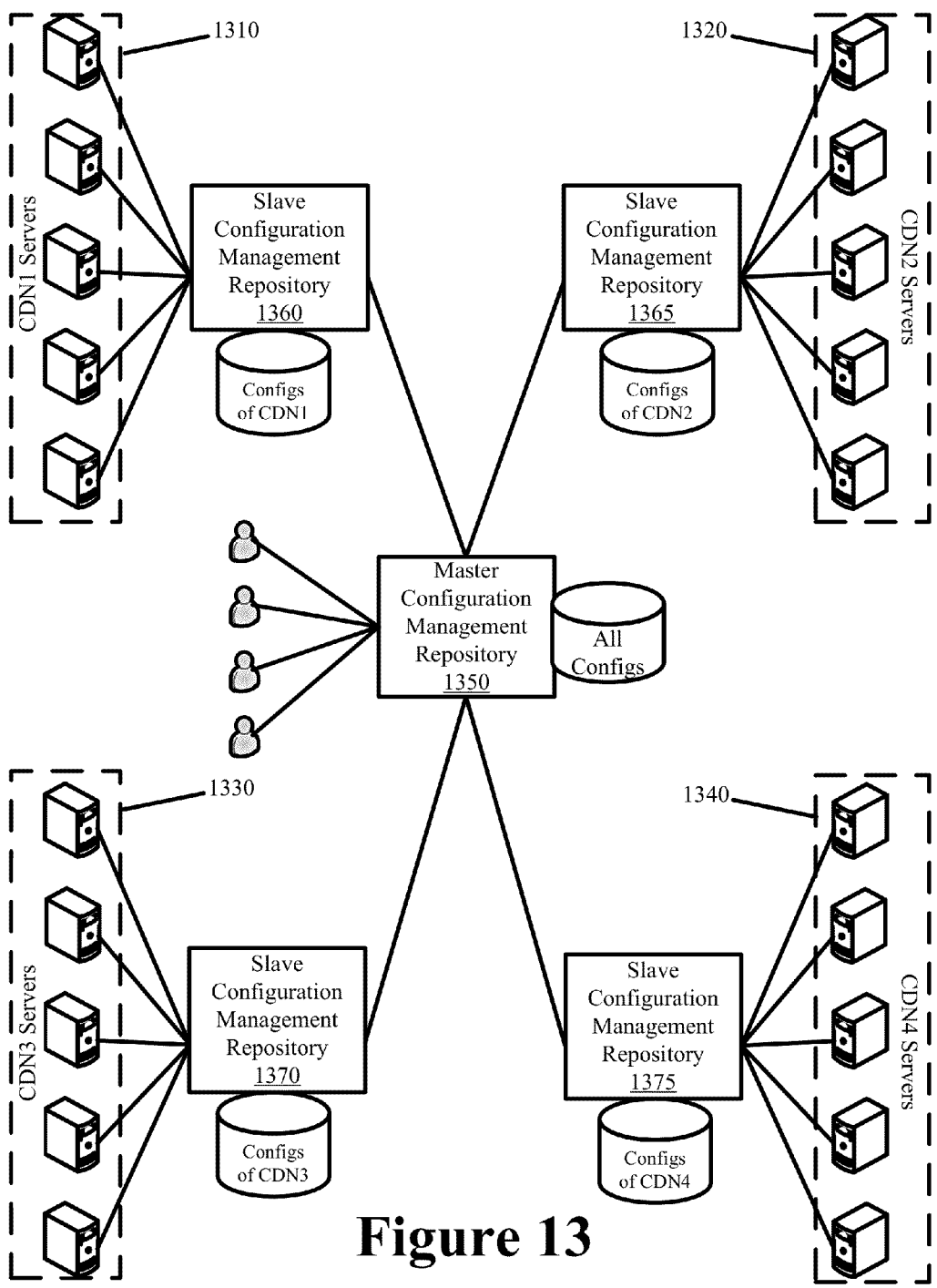
FIGS. 13-15 illustrate various alternative frameworks for integrating the configuration management repository of some embodiments with an Open CDN platform.

FIG. 13 illustrates an alternative framework for integrating the configuration management repository of some embodiments with an Open CDN platform. In this figure, the Open CDN platform is comprised of a first set of servers 1310 that are operated by a first CDNSP, a second set of servers 1320 that are operated by a second CDNSP, a third set of servers 1330 that are operated by a third CDNSP, and a fourth set of servers 1340 that are operated by a fourth CDNSP. To manage the configurations for the Open CDN platform, a master slave configuration management repository framework is provided. The framework provides a master repository 1350 that is communicably coupled to a set of slave configuration management repositories 1360, 1365, 1370, and 1375. A slave configuration management repository is also referred to as a slave repository. Each slave repository (e.g., 1360-1375) is collocated with one of the four CDNSPs.

In this framework, the master repository 1350 manages all configurations for the Open CDN platform. Accordingly, customers of the first, second, third, and fourth CDNSPs interface with the master repository 1350 to specify and modify configurations. The master repository 1350 offloads the deployment of the configurations to the various slave repositories 1360-1375. Specifically, the slave repository 1360 deploys configurations across the first set of servers 1310, the slave repository 1365 deploys configurations across the second set of servers 1320, the slave repository 1370 deploys configurations across the third set of servers 1330, and the slave repository 1375 deploys configurations across the fourth set of servers 1340. To perform the deployment, each slave repository 1360-1375 mirrors from the master repository 1350 a subset of configurations that are to be deployed to the set of servers that the slave repository manages. The master repository 1350 maintains a list to specify which configurations are for which slave repositories such that when there is an update to a configuration, that update is forwarded to the proper slave repository. This list can be maintained by modifying the granularity with which the groups are defined. For example, a first group and second group may include the same applications, application configurations, and customer configurations for Flash content streaming. However, the first group may be associated with servers of the first set of servers 1310 and the second group may be associated with servers of the second set of servers 1320. Therefore, when a configuration in the first and second groups is updated, the updated configuration in the first group is forwarded to the slave repository 1360 that manages configurations for the first set of servers 1310 and the updated configuration in the second group is forwarded to the slave repository 1365 that manages configurations for the second set of servers 1320.

In some embodiments, the master repository 1350 modifies the configurations before forwarding them to the appropriate slave repositories for deployment. In some such embodiments, the modifications are performed to convert the format of the configuration to one that is suitable for deployment to the servers. For example, the master repository 1350 converts a configuration from a first file format (e.g., Open CDN file format) to a second file format (e.g., XML or JSON format). The modifications may also include removing or modifying certain parameters from the configuration when passing that same configuration to different CDNSPs. These modifications may be required to adapt the configuration for deployment in a particular CDNSP. This may include modifying identifiers, formatting, and addressing in the configuration. For example, the master repository 1350 may populate a configuration with IP addresses for servers of the first set servers 1310 when passing that configuration to the first CDNSP for deployment and may populate the configuration with IP addresses for servers of the second set of servers 1320 when passing that configuration to the second CDNSP for deployment. As another example, the master repository 1350 may modify between Open CDN identifiers and native identifiers (e.g., customer identifiers, server identifiers, etc.) used by each of the CDNSPs when passing the configuration to each of the CDNSPs for deployment. Yet another example, may include utilizing servers of a first CDNSP to perform user authentication and redirecting servers of a second CDNSP to the servers of the first CDNSP in order to perform the user authentication. In this manner, the master repository 1350 can retain configuration privacy such that the CDNSPs are exposed parameters that are only relevant for their deployment purposes without disclosing information that is relevant to other CDNSPs.

In some embodiments, the modifications described above are performed at each of the slave repositories 1360-1375 instead of at the master repository 1350. In some such embodiments, the master repository 1350 forwards a configuration to one or more of the slave repositories that then adapt the configuration for the set of servers of the corresponding CDNSP.

Figure 14:
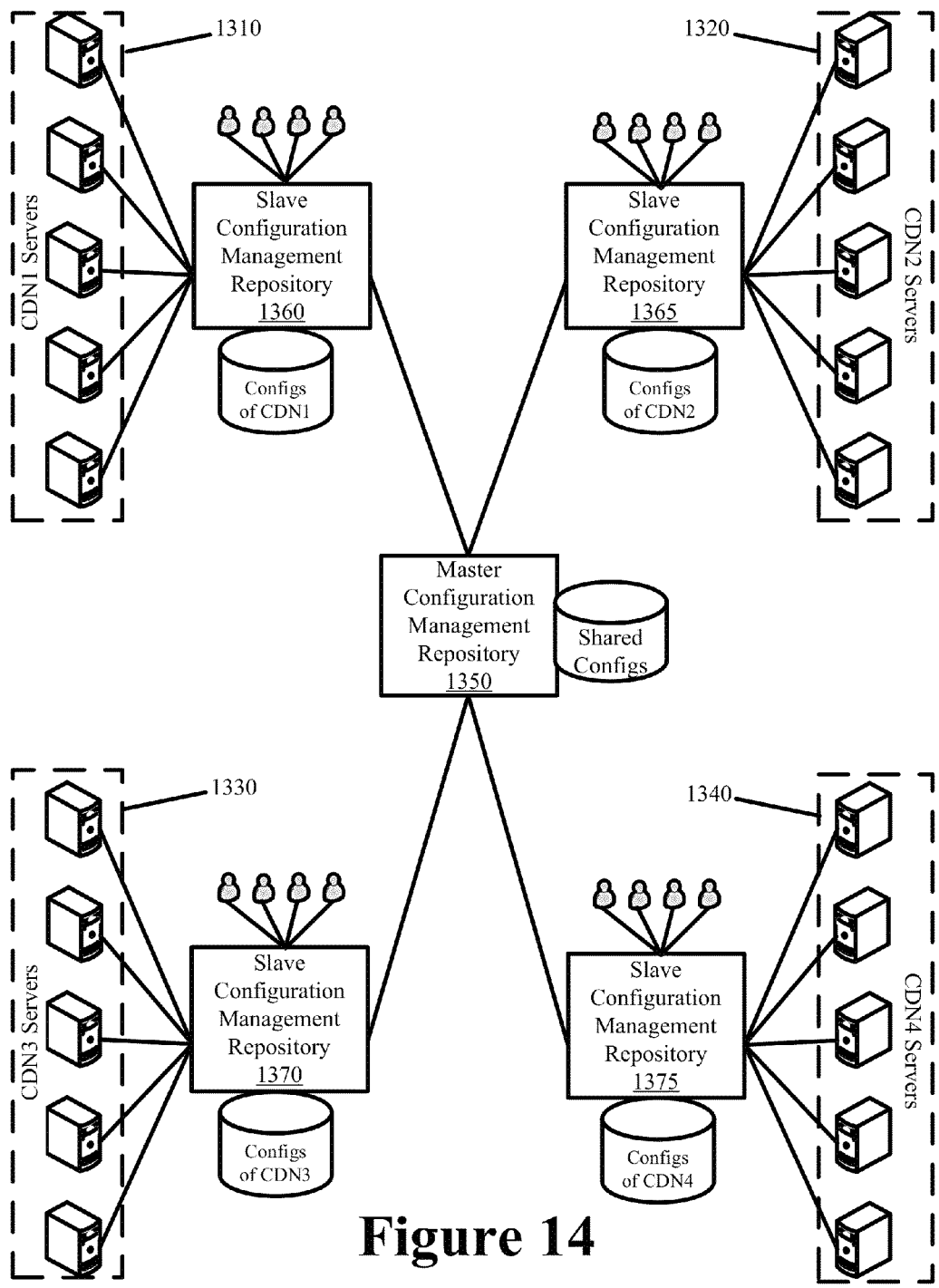

FIG. 14 illustrates yet another framework for integrating the configuration management repository of some embodiments with an Open CDN platform. The framework includes the same components as the framework illustrated in FIG. 13. However, in the framework of FIG. 14, customers of each CDNSP interface with the corresponding slave repository of that CDNSP instead of interfacing with the master repository 1350. Accordingly, the customers of a particular CDNSP specify and modify their configurations using the slave repository for that particular CDNSP. The slave repository then forwards the specified or modified configurations to the master repository 1350 from where they are mirrored to other slave repositories when the configuration is a shared configuration. Configurations that are not shared in the Open CDN platform are not forwarded to the master repository 1350 and are instead wholly retained by the slave repository. A shared configuration may include a customer configuration that is deployed to servers that are operated by at least two different CDNSPs. A shared configuration may also include an application image and application configuration that multiple CDNSPs support. This modified framework reduces the demand on the master repository 1350 as the user interactions are offloaded to the slave repositories 1360-1375, deployment is offloaded to the slave repositories 1360-1375, and the master repository 1350 is used only for shared configurations. It should be apparent the either the slave repositories 1360-1375 or the master repository 1350 of FIG. 14 can be used to modify configurations for deployment to servers of the different CDNSPs as described above with reference to FIG. 13.

Figure 15:
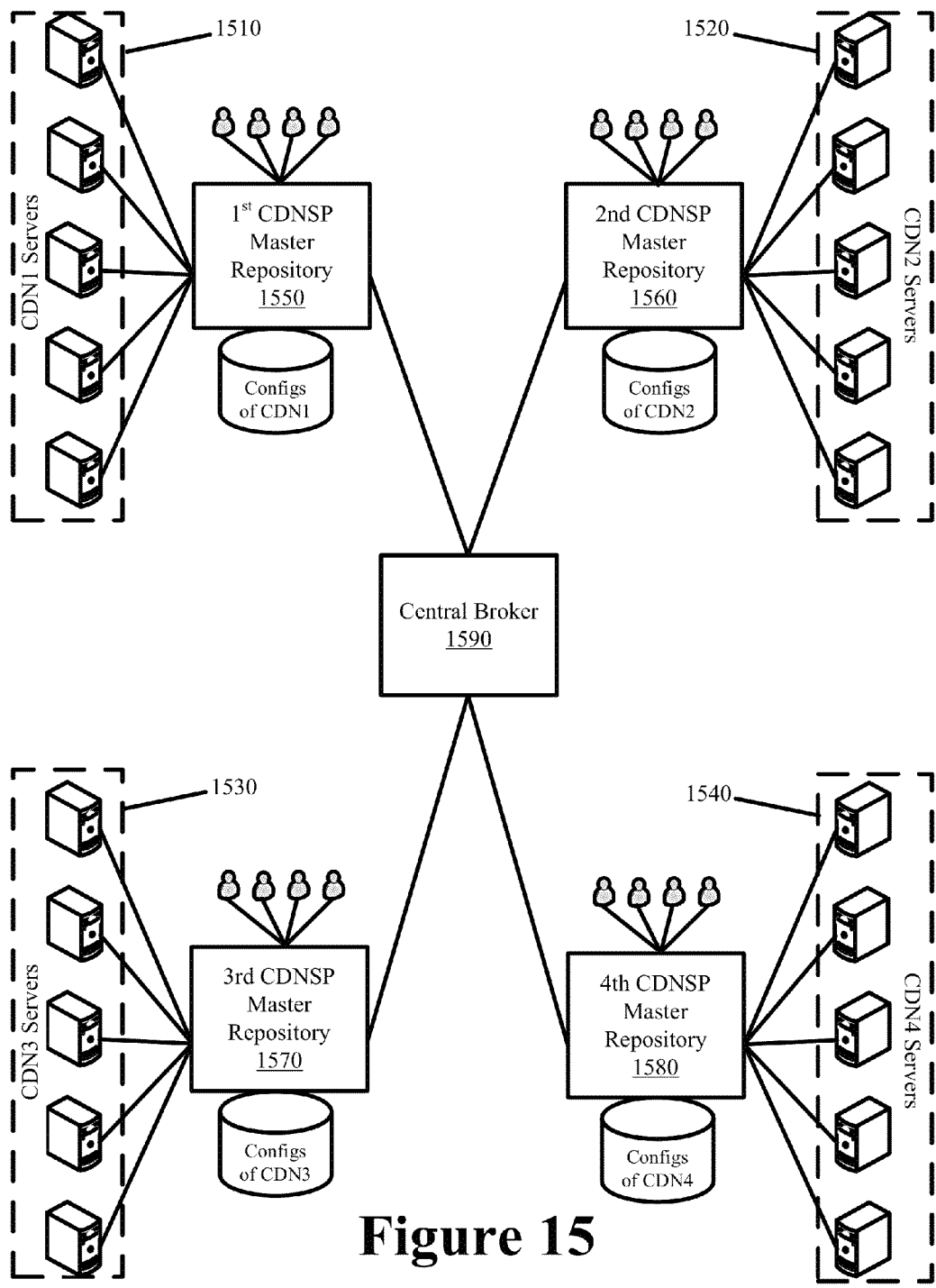

FIG. 15 illustrates a distributed framework for integrating the configuration management repository of some embodiments with an Open CDN platform. FIG. 15 includes the different sets of servers 1510, 1520, 1530, and 1540 that are operated by the different CDNSPs. However, each CDNSP includes its own master repository. As shown, a first master repository 1550 is provided for managing configurations for customers of the first CDNSP and for deploying configurations to the first set of servers 1510, a second master repository 1560 is provided for managing configurations for customers of the second CDNSP and for deploying configurations to the second set of servers 1520, a third master repository 1570 is provided for managing configurations for customers of the third CDNSP and for deploying configurations to the third set of servers 1530, and a fourth master repository 1580 is provided for managing configurations for customers of the fourth CDNSP and for deploying configurations to the fourth set of servers 1540. Additionally, a central broker 1590 is provided to manage the passing of configurations between the different master repositories 1550-1580. In this manner, each CDNSP of the Open CDN platform maintains control over their customers' configurations and the deployment of configurations to their servers.

When a configuration is to be deployed to servers of a foreign CDNSP or to servers that are outside of the control of the master repository for the CDNSP of the customer, the master repository utilizes the central broker 1590 to distribute the configuration to the appropriate master repositories. Specifically, each master repository identifies which of the customer configurations that it manages are exposed to one or more foreign CDNSP. When such a foreign exposed configured is updated, the master repository passes the update to the central broker 1590. The central broker 1590 then fans out the update to the appropriate other master repositories that then deploy the configuration to the appropriate servers. Alternatively, the central broker 1590 may directly deploy the configuration to the servers of the foreign CDNSP based on instruction from the master repository that manages the configuration. For example, a customer of the second CDNSP may update a configuration using the master repository 1560 for the second CDNSP. The master repository 1560 identifies that the configuration is deployed to servers of the second CDNSP and the update is then deployed to those servers. Additionally, the master repository 1560 identifies that the configuration is also deployed to servers of the fourth CDNSP. Accordingly, the master repository 1560 passes the updated configuration to the central broker 1590 which then forwards the updated configuration to the master repository 1580 of the fourth CDNSP for deployment or directly deploys the updated configuration to the appropriate servers of the fourth set of servers 1540.

In some embodiments, the central broker 1590 acts as trusted intermediary from which configurations can be passed between the CDNSPs. The central broker 1590 may be operated independently of the CDNSPs by the Open CDN platform. The central broker 1590 may also be used to modify configurations that are exposed to different CDNSPs to change addressing, parameters, identifiers, formats, etc.

It should be apparent that the frameworks of FIGS. 12-15 are exemplary frameworks for scaling the configuration management repository. It should further be apparent that other frameworks may be used to scale the configuration management repository. For example, some embodiments incorporate redundancy by replicating each master repository or by replicating the central broker. Some embodiments include additional tiers of master repositories or slave repositories to supplement those illustrated in FIGS. 12-15 to further scale the configuration management repository. Additionally, a slave configuration management repository may be included at each Point-of-Presence (POP) where a subset of servers from a particular CDNSP may be located.

IV. Server System

Many of the above-described processes and components are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, desktop computers, server computers. Examples of computer readable media include, but are not limited to, CD-ROMs, flash drives, RAM chips, hard drives, EPROMs, etc.

Figure 16:
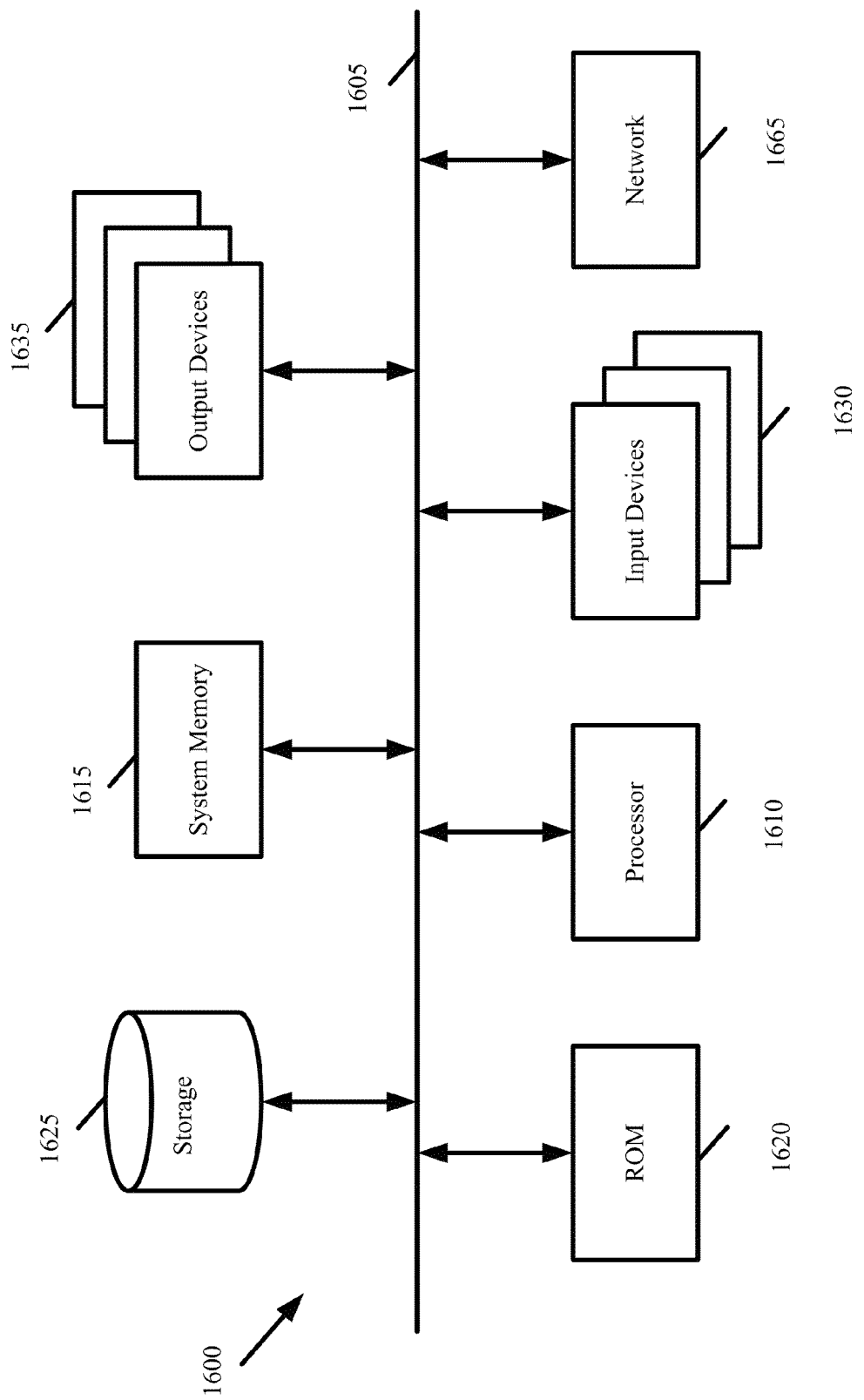
FIG. 16 illustrates a computer system or server with which some embodiments are implemented.

FIG. 16 illustrates a computer system or server with which some embodiments are implemented. Such a computer system includes various types of computer readable mediums and interfaces for various other types of computer readable mediums that implement the various processes and modules described above (e.g., configuration management repository, function processor, and configuration store). Computer system 1600 includes a bus 1605, a processor 1610, a system memory 1615, a read-only memory 1620, a permanent storage device 1625, input devices 1630, and output devices 1635.

The bus 1605 collectively represents all system, peripheral, and chipset buses that communicatively connect the numerous internal devices of the computer system 1600. For instance, the bus 1605 communicatively connects the processor 1610 with the read-only memory 1620, the system memory 1615, and the permanent storage device 1625. From these various memory units, the processor 1610 retrieves instructions to execute and data to process in order to execute the processes of the invention. The processor 1610 is a processing device such as a central processing unit, integrated circuit, graphical processing unit, etc.

The read-only-memory (ROM) 1620 stores static data and instructions that are needed by the processor 1610 and other modules of the computer system. The permanent storage device 1625, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1625.

Other embodiments use a removable storage device (such as a flash drive) as the permanent storage device Like the permanent storage device 1625, the system memory 1615 is a read-and-write memory device. However, unlike storage device 1625, the system memory is a volatile read-and-write memory, such as random access memory (RAM). The system memory stores some of the instructions and data that the processor needs at runtime. In some embodiments, the processes are stored in the system memory 1615, the permanent storage device 1625, and/or the read-only memory 1620.

The bus 1605 also connects to the input and output devices 1630 and 1635. The input devices enable the user to communicate information and select commands to the computer system. The input devices 1630 include alphanumeric keypads (including physical keyboards and touchscreen keyboards), pointing devices (also called "cursor control devices"). The input devices 1630 also include audio input devices (e.g., microphones, MIDI musical instruments, etc.). The output devices 1635 display images generated by the computer system. The output devices include printers and display devices, such as cathode ray tubes (CRT) or liquid crystal displays (LCD).

Finally, as shown in FIG. 16, bus 1605 also couples computer 1600 to a network 1665 through a network adapter (not shown). In this manner, the computer can be a part of a network of computers (such as a local area network ("LAN"), a wide area network ("WAN"), or an Intranet, or a network of networks, such as the internet. For example, the computer 1600 may be communicably coupled through the network 1665 to an ingest server, mid-tier server, edge server, content provider streaming server, or end user device.

As mentioned above, the computer system 1600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for managing a plurality of server configurations that are deployed across a plurality of servers, the method comprising:

with a computer having at least one processor and non-transitory computer readable storage:
  storing the plurality of server configurations to the non-transitory computer readable storage;
  tracking different subsets of the plurality of servers to which each of the plurality of server configurations is deployed;
  receiving a modification to a first server configuration of the plurality of server configurations;
  identifying a subset of the plurality of servers that operate according to the first server configuration;
  modifying operation of the subset of the plurality of servers by automatedly deploying the first server configuration with the modification from the non-transitory computer readable storage to each server of the subset of the plurality of servers; and
  deploying a second server configuration of the plurality of configurations to the subset of the plurality of servers to run concurrently with the first server configuration, wherein the first server configuration directs caching and delivery operation of the subset of the plurality of servers for content of a first content provider and the second server configuration directs caching and delivery operation of the subset of the plurality of servers for content of a second content provider.

2. The method of claim 1, wherein the plurality of servers provide caching and delivery of content on behalf of a plurality of content providers, and wherein any specific server configuration of the plurality of server configurations specifies different content caching and delivery operation for a subset of servers that is deployed with the specific server configuration.

3. The method of claim 1, wherein modifying operation of the subset of the plurality of servers comprises modifying content caching and delivery functions of the subset of the plurality of servers according to the modification of the first server configuration.

4. The method of claim 1 further comprising monitoring performance of the subset of the plurality of servers when operating according to the first server configuration without the modification and when operating according to the first server configuration with the modification.

5. The method of claim 4 further comprising automatically redeploying the first server configuration without the modification when the performance of the subset of the plurality of servers is better without the modification to the first server configuration than with the modification.

6. A server configuration management repository for managing and deploying server configurations across a plurality of servers of a distributed platform that provide content caching and content delivery on behalf of a plurality of distributed platform customers, the server configuration management repository comprising:
  non-transitory computer-readable storage storing (i) a plurality of different versions for a particular server configuration, each version of the plurality of different versions modifying some aspect of content caching and delivery operation specified in the particular server configuration and (ii) for each particular version of the plurality of different versions, storing at least one metric measuring content caching and delivery performance of a set of servers when the set of servers are deployed with the particular version of the particular server configuration; and
  a processor operable to (i) deploy an updated version of the particular server configuration that modifies content caching and delivery operation of the set of servers operating according to a previous version of the particular server configuration, (ii) compare metrics measuring content caching and delivery performance of the set of servers when operating with the updated version of the particular server configuration and when operating with the previous version of the particular server configuration, and (iii) redeploy the set of servers with the previous version of the particular server configuration when content caching and delivery performance from the previous version of the particular server configuration exceeds content caching and delivery performance from the updated version of the particular server configuration.

7. The server configuration management repository of claim 6 further comprising a network interface over which to deploy the particular server configuration to the set of servers.

8. The server configuration management repository of claim 6, wherein the processor is further operable to execute a first user function, wherein executing the first user function comprises producing a copy of the particular server configuration on a user machine from a master instance of the particular server configuration that is stored to the non-transitory computer-readable storage.

9. The server configuration management repository of claim 8, wherein the processor is further operable to execute a second user function, wherein executing the second user function comprises generating the updated version of the particular server configuration in the non-transitory computer-readable storage by merging a user provided modification to the master instance of the particular server configuration.

10. The server configuration management repository of claim 6, wherein the non-transitory computer-readable storage further stores a mapping that identifies the set of servers from a plurality of servers that are to be deployed with the particular server configuration.

11. A configuration management repository for managing a plurality of configurations that are deployed across a plurality of servers of a distributed platform, the configuration management repository comprising:
  a network interface coupled to the plurality of servers;
  a processor; and
  a non-transitory computer-readable storage storing:
    the plurality of configurations;
    a plurality of mappings identifying different sets of the plurality of servers to which each configuration of the plurality of the configurations is deployed, each configuration specifying different operational parameters for a set of servers that is deployed with that configuration; and
  a computer program configuring the processor to:
    receive a modification to a first configuration of the plurality of configurations that specifies operational parameters configured for a first distributed platform customer;
    retrieve a particular mapping for the first configuration from the plurality of mappings, the particular mapping identifying a set of servers from the plurality of servers to which said first configuration is deployed; and
    automatically deploy the first configuration comprising the received modification to the set of servers and a second configuration of the plurality of configurations that specifies operational parameters configured for a different second distributed platform customer to the set of servers to run concurrently with the first server configuration, wherein the first server configuration directs content caching and delivery operation of the set of servers for content of the first distributed platform customer and the second server configuration directs content caching and delivery operation of the set of servers for content of the second distributed platform customer.

12. The configuration management repository of claim 11, wherein the operational parameters specify custom content caching and delivery operation.

13. The configuration management repository of claim 11, wherein the computer program further configures the processor to obtain timestamps indicating status of the deployment of the first configuration to each server of the set of servers.

14. The configuration management repository of claim 11, wherein the computer program further configures the processor to perform a syntax check of the first configuration and withholding deployment of the first configuration if an error is found during the syntax check.

15. The configuration management repository of claim 11, wherein the computer program further configures the processor to simulate the first configuration prior to deploying the first configuration to the set of servers.

16. The configuration management repository of claim 11, wherein the computer program further configures the processor to monitor performance of the set of servers when configured with the first configuration without the modification and when configured with the first configuration with the modification.

* * * * *